US012300035B1

(12) United States Patent
Xu et al.

(10) Patent No.: US 12,300,035 B1
(45) Date of Patent: May 13, 2025

(54) LIVENESS DETECTION BASED ON MOTION, FACE, AND CONTEXT CUES

(71) Applicant: Amazon Technologies, Inc., Seattle, WA (US)

(72) Inventors: Xiang Xu, New Hyde Park, NY (US); Mingze Xu, Kirkland, WA (US); Zheng Zhang, Bellevue, WA (US); Yuanjun Xiong, Seattle, WA (US); Wei Xia, Seattle, WA (US); Jonathan Wu, Seattle, WA (US); Joseph P Tighe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 376 days.

(21) Appl. No.: 17/708,492

(22) Filed: Mar. 30, 2022

(51) Int. Cl.
*G06V 40/40* (2022.01)
*G06T 7/00* (2017.01)
(Continued)

(52) U.S. Cl.
CPC .......... *G06V 40/45* (2022.01); *G06T 7/0002* (2013.01); *G06T 7/20* (2013.01); *G06T 7/70* (2017.01);
(Continued)

(58) Field of Classification Search
CPC ...... G06V 40/45; G06V 10/764; G06V 10/82; G06V 20/40; G06V 40/161; G06V 40/171;
(Continued)

(56) References Cited

U.S. PATENT DOCUMENTS 8,856,541 B1 10/2014 Chaudhury et al.
9,886,639 B2 2/2018 Martin
(Continued)

FOREIGN PATENT DOCUMENTS

AU 2018280235 B2 * 8/2020 ........... G06F 18/214
CA 3041952 A1 * 4/2019 ............. B42D 25/00
(Continued)

OTHER PUBLICATIONS

Carreira et al., "Quo Vadis, Action Recognition? A New Model and the Kinetics Dataset", arXiv:1705.07750v1 [cs.CV], May 22, 2017, 10 pages.
(Continued)

*Primary Examiner* — Asghar H Bilgrami
(74) *Attorney, Agent, or Firm* — Nicholson De Vos Webster & Elliott LLP

(57) ABSTRACT

Techniques for liveness detection using a motion, face, and context cues. The techniques can be implemented to prevent against successful presentation attacks, video injection attacks, and deepfake attacks. In some examples, the techniques encompass receiving a set of video frames from a personal computing device. A first liveness determination can be made using a motion-based model based on the received video frames. A second liveness determination can be made using a face-based model based on the received video frames. A third liveness determination can be made using a context-based model based on the received video frames. A final liveness determination can be made based on the first, second and third liveness determinations.

20 Claims, 17 Drawing Sheets

(51) Int. Cl.

| | |
|---|---|
| *G06T 7/20* | (2017.01) |
| *G06T 7/70* | (2017.01) |
| *G06T 11/00* | (2006.01) |
| *G06V 10/764* | (2022.01) |
| *G06V 10/82* | (2022.01) |
| *G06V 20/40* | (2022.01) |
| *G06V 40/16* | (2022.01) |

(52) U.S. Cl.
CPC ............ *G06T 11/00* (2013.01); *G06V 10/764* (2022.01); *G06V 10/82* (2022.01); *G06V 20/40* (2022.01); *G06V 40/161* (2022.01); *G06V 40/171* (2022.01); *G06V 40/172* (2022.01); *G06T 2207/10016* (2013.01); *G06T 2207/20081* (2013.01); *G06T 2207/20084* (2013.01); *G06T 2207/30201* (2013.01); *G06T 2210/12* (2013.01)

(58) Field of Classification Search
CPC ....... G06V 40/172; G06T 7/0002; G06T 7/20; G06T 7/70; G06T 11/00; G06T 2207/10016; G06T 2207/20081; G06T 2207/20084; G06T 2207/30201; G06T 2210/12

See application file for complete search history.

(56) References Cited

U.S. PATENT DOCUMENTS

| | | | |
|---|---|---|---|
| 11,126,879 B1 | 9/2021 | Vemulapalli et al. | |
| 11,210,541 B2 | 12/2021 | Ding et al. | |
| 11,425,562 B2 | 8/2022 | Lecun et al. | |
| 11,954,940 B2 | 4/2024 | Levinski et al. | |
| 2013/0188840 A1* | 7/2013 | Ma | G06V 40/45 382/107 |
| 2015/0324629 A1* | 11/2015 | Kim | G06T 7/0002 382/203 |
| 2018/0046852 A1* | 2/2018 | Ionita | G06V 40/167 |
| 2018/0060648 A1* | 3/2018 | Yoo | G06V 40/40 |
| 2018/0173980 A1 | 6/2018 | Fan et al. | |
| 2018/0260643 A1 | 9/2018 | Sheikh et al. | |
| 2018/0276488 A1* | 9/2018 | Yoo | G06V 40/169 |
| 2018/0307815 A1* | 10/2018 | Samadani | G06V 40/45 |
| 2018/0336397 A1 | 11/2018 | Smith | |
| 2018/0357500 A1* | 12/2018 | Lin | G06T 7/70 |
| 2019/0303551 A1 | 10/2019 | Tussy | |
| 2019/0340349 A1* | 11/2019 | Kong | G06F 21/32 |
| 2020/0082192 A1 | 3/2020 | Ding et al. | |
| 2020/0184278 A1* | 6/2020 | Zadeh | G06N 3/044 |
| 2020/0257914 A1 | 8/2020 | Wu et al. | |
| 2020/0410074 A1 | 12/2020 | Dang et al. | |
| 2021/0117529 A1 | 4/2021 | Zamora et al. | |
| 2022/0148337 A1 | 5/2022 | Meng et al. | |
| 2023/0073410 A1 | 3/2023 | Tussy et al. | |
| 2023/0186685 A1 | 6/2023 | Zhang et al. | |
| 2023/0222842 A1 | 7/2023 | Hua et al. | |

FOREIGN PATENT DOCUMENTS

| | | | | |
|---|---|---|---|---|
| CA | 3045819 | A1 * | 12/2019 | ............ G06F 21/32 |
| CA | 3133293 | A1 * | 4/2022 | ......... G06K 9/00255 |
| CA | 2902093 | C * | 3/2023 | ............ G06F 21/32 |
| CN | 214670650 | U * | 11/2021 | ............ A61B 5/024 |
| GB | 2560340 | A | 9/2018 | |
| GB | 2561607 | A * | 10/2018 | ......... G06K 9/00221 |
| KR | 102318051 | B1 * | 10/2020 | |
| KR | 20220030178 | A * | 8/2021 | |
| MY | 191774 | A * | 7/2022 | |
| WO | 2017/098457 | A1 | 6/2017 | |
| WO | WO-2020159437 | A1 * | 8/2020 | |
| WO | WO-2020205597 | A1 * | 10/2020 | ............ B60W 30/182 |
| WO | WO-2020243689 | A1 * | 12/2020 | ............ G06F 21/32 |

OTHER PUBLICATIONS

Fan et al., "Multiscale Vision Transformers", arXiv:2104.11227v1 [cs.CV], Apr. 22, 2021, 18 pages.

Feichtenhofer et al., "SlowFast Networks for Video Recognition", arXiv:1812.03982v1 [cs.CV], Dec. 10, 2018, 11 pages.

Hou et al., "Tube Convolutional Neural Network (T-CNN) for Action Detection in Videos", arXiv:1703.10664v1 [cs.CV], Mar. 30, 2017, 11 pages.

Liu et al., "Swin Transformer: Hierarchical Vision Transformer using ShiftedWindows", arXiv:2103.14030v1 [cs.CV], Mar. 25, 2021, 13 pages.

Tran et al., "Dense Prediction for Micro-Expression Spotting based on Deep Sequence Model", Society for Imaging Science and Technology, IS&T International Symposium on Electronic Imaging 2019, Imaging and Multimedia Analytics in a Web and Mobile World 2019, 2019, pp. 401-1-401-5.

Tran et al., "Sliding Window Based Micro-Expression Spotting: A Benchmark", International Conference on Advanced Concepts for Intelligent Vision Systems, Sep. 2017, 12 pages.

Zhang et al., "SMEConvNet: A Convolutional Neural Network for Spotting Spontaneous Facial Micro-Expression From Long Videos", IEEE Access, vol. 6, Nov. 2018, pp. 71143-71151.

Zhao et al., "MaskFlownet: Asymmetric Feature Matching with Learnable Occlusion Mask", 2020 IEEE/CVF Conference on Computer Vision and Pattern Recognition (CVPR), Jun. 2020, pp. 6278-6287.

Android Developers, "CameraCharacteristics," Available Online at <https://developer.android.com/reference/android/hardware/camera2/CameraCharacteristics>, Mar. 17, 2022, 191 pages.

Android Developers, "FaceDetector", Available Online at <https://developer.android.com/reference/android/media/faceDetector>, Feb. 10, 2022, 7 pages.

Apple Developer Documentation, "AVCameraCalibrationData", Available Online at <https://developer.apple.com/documentation/avfoundation/avcameracalibrationdata>, Retrieved on Mar. 27, 2022, 2 pages.

Apple Developer Documentation, "Tracking the User's Face in Real Time", Available Online at <https://developer.apple.com/documentation/vision/tracking_the_user_s_face_in_real_time>, Retrieved on Mar. 27, 2022, 4 pages.

Apple Developer Documentation, "VNFacelLandmarks2D", Available Online at <https://developer.apple.com/documentation/vision/vnfacelandmarks2d>, Retrieved on Mar. 27, 2022, 3 pages.

Facetec, Inc., "Face Matching Overview", Available Online at <https://dev.facetec.com/matching-guide>, 2022, 3 pages.

Github, "tfjs-models/blazeface at master", tensorflow/tfjs-models, Available Online at <https://github.com/tensorflow/tfjs-models/tree/master/blazeface>, Jan. 26, 2022, 4 pages.

Google Developers, "Machine Learning for Mobile Developers", ML Kit, Available Online at <https://developers.google.com/ml-kit>, Retrieved on Mar. 27, 2022, 5 pages.

Just a Dude who Hacks, "face-api.js", Available Online at <https://justaduewhohacks.github.io/face-api.js/docks/index.html>, Retrieved on Mar. 27, 2022, 22 pages.

Ruff et al., "Deep Semi-Supervised Anomaly Detection", ICLR 2020, Available Online at <https://arxiv.org/pdf/1906.02694.pdf>, Feb. 14, 2020, pp. 1-23.

Strauss et al., "Ensemble Methods as a Defense to Adversarial Perturbations Against Deep Neural Networks", ICLR 2018, Available Online at <https://arxiv.org/abs/1709.03423>, Feb. 9, 2018, pp. 1-10.

Ushanka, White, "How to spoof IProov," YouTube, Available Online at <https://www.youtube.com/watch?v=GxJjXKJGvKw>, Dec. 30, 2021, 3 pages.

Wandell, Brian A., "Chapter 9: Color", Foundations of Vision, Stanford University, Available Online at <https://foundationsofvision.stanford.edu/chapter-9-color/>, Retrieved on Mar. 27, 2022, 43 pages.

Xu et al., "On Improving Temporal Consistency for Online Face Liveness Detection System", Computer Vision and Pattern Recognition, Available Online at <https://arxiv.org/abs/2006.06756>, Jun. 11, 2020, pp. 1-17.

(56) References Cited

OTHER PUBLICATIONS

Zenni Optical, "How to Measure Your Pupillary Distance (PD)", Available Online at <https://www.zennioptical.com/measuring-pd-inforgraphic>, Retrieved on Mar. 27, 2022, 10 pages.

Zhang et al., "Attacking CNN-based anti-spoofing face authentication in the physical domain", IEEE, Cryptography and Security, Available Online at <https://arxiv.org/abs/1910.00327>, Oct. 1, 2019, pp. 1-10.

Non-Final Office Action, U.S. Appl. No. 17/708,938, filed Jul. 23, 2024, 27 pages.

Final Office Action, U.S. Appl. No. 17/708,938, Nov. 15, 2024, 36 pages.

Non-Final Office Action, U.S. Appl. No. 17/708,406, Nov. 18, 2024, 34 pages.

Non-Final Office Action, U.S. Appl. No. 17/850,421, Nov. 25, 2024, 17 pages.

\* cited by examiner

CUT PATTERN 302

——— T1 ——— T2 ——— T3 ——— T4 ——▶

CUT PATTERN WITH GAP 304

——— T1 ——— T2 ——— T3 ——— T4 ——▶

HORIZONTAL WIPE PATTERN 306

——— T1 ——— T2 ——— T3 ——— T4 ——▶

VERTICAL WIPE PATTERN 308

——— T1 ——— T2 ——— T3 ——— T4 ——▶

US 12,300,035 B1

LIVENESS DETECTION BASED ON MOTION, FACE, AND CONTEXT CUES

BACKGROUND

The rapid development of deep machine learning techniques has increased the prevalence of face authentication systems for web services. Face authentication is a form of biometric authentication in which a human face depicted in a digital image is authenticated. For example, the face can be captured by a digital camera such as one integrated with or coupled to the user's smart phone, laptop computer, or desktop computer. The captured image can then be placed into an input data stream from the user's device to the face authentication system. The face authentication system can be programmed or configured to consume the captured image from the input data stream and analyze the image to determine if a face depicted in the image is a known face.

Unfortunately, human faces can be easily captured and reproduced. This makes face authentication systems vulnerable to a variety of attacks. In a presentation attack, an attacking user presents a presentation attack instrument representing an impersonated face to a digital camera. The presentation attack instrument can be, for example, a photograph of the impersonated face, a video screen displaying the impersonated face, or a mask of the impersonated face worn by the attacking user. In an injection attack, an image of the impersonated face that is pre-generated or generated in real-time is injected into the input data stream consumed by the face authentication system. In a deepfake attack, an image of an impersonated face is injected into the input data stream like with an injection attack however deep artificial intelligence techniques are used to generate a hyper-realistic image of the impersonated face. With a presentation attack, a video injection attack, or a deepfake attack, the face authentication system can be tricked into authenticating the impersonated face.

The software and web services industry has, in response, introduced a number of products and technologies to address and minimize these threats, including "liveness detection"-designed to keep malicious users from authenticating with a computer system, web service, or provider network as another person without the other person's permission or knowledge. A typical liveness detection technique incorporates a challenge-response protocol. The user to be authenticated is presented with a challenge. The user can respond in accordance with the challenge instructions. The challenge response can then be verified to determine if the response is by a live human. Some example challenges can include asking the user to blink their eyes, reading words or numbers aloud, head movements, and handheld camera movements.

Unfortunately, attacking users can still bypass liveness detection techniques using modern computer technology such as graphics processing units (GPUs) and virtual camera software. Thus, improvements to liveness detection techniques that reduce or eliminate the threat of presentation, injection, or deepfake attacks would be appreciated.

BRIEF DESCRIPTION OF DRAWINGS

Various examples in accordance with the present disclosure will be described with reference to the drawings, in which.

DETAILED DESCRIPTION

Figure 1:
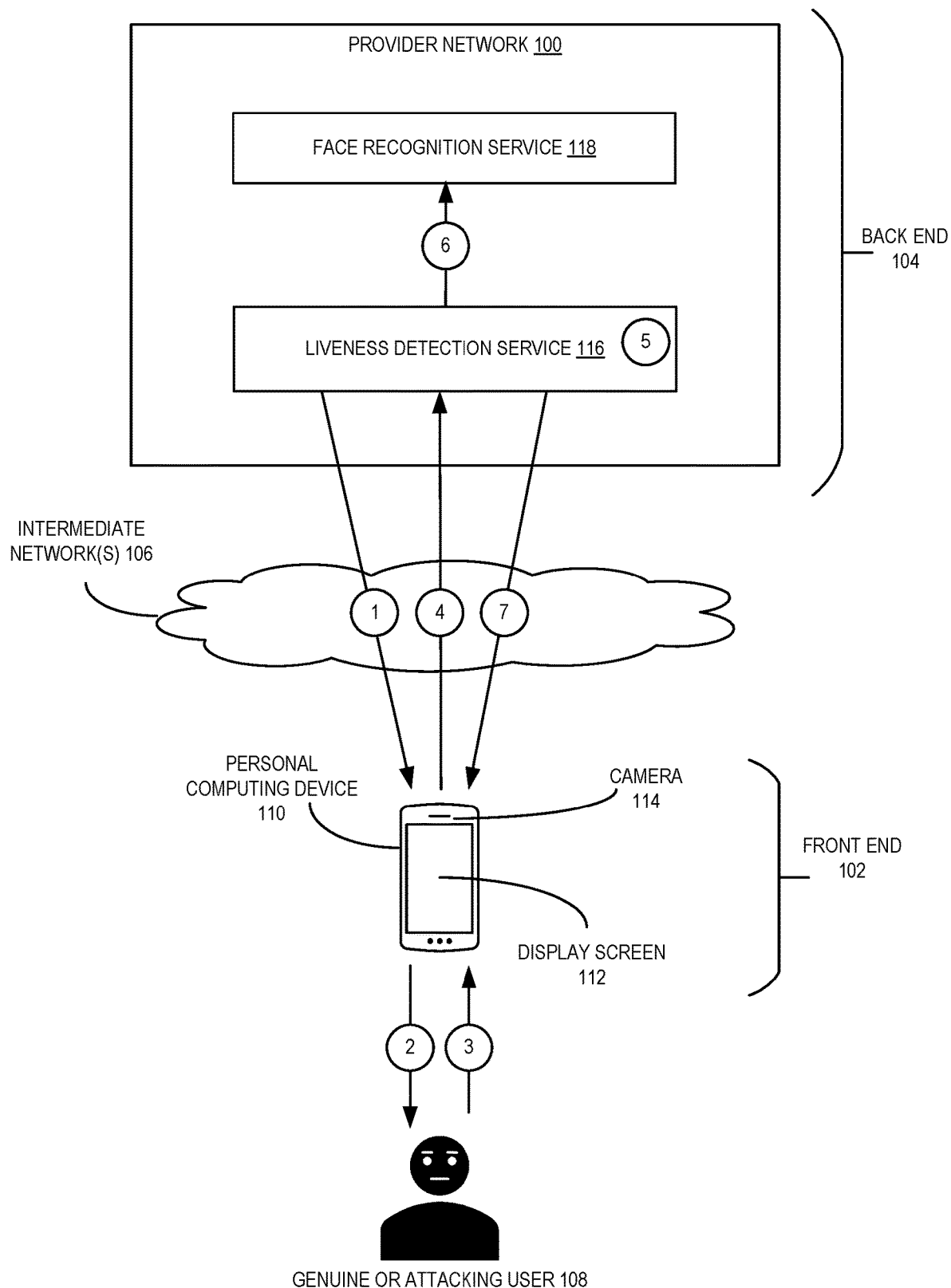
FIG. 1 is a high-level diagram of a face authentication computer system in the context of a provider network environment, according to some examples.

The present disclosure relates to methods, apparatus, systems, and non-transitory computer-readable media for hybrid liveness detection, for liveness detection based on motion, face, and context cues, and for liveness detection based on display screen light reflections.

General Overview

In one aspect, techniques for hybrid liveness detection are disclosed. The techniques for hybrid liveness detection can be implemented to prevent against successful presentation attacks, injection attacks, and deepfake attacks. In some examples, the hybrid techniques encompass a set of one or more active liveness detection techniques and a set of one or more passive liveness detection techniques.

An active technique can include use of a liveness challenge. In some examples, an active technique encompasses a face bounding shape liveness challenge. The face bounding shape challenge can be presented on a display screen of a personal computing device. The face bounding shape challenge can encompass a set of one or more bounding shapes that can be presented on the display screen. The face bounding shape challenge can request a user of the personal computing device to move their face, as captured and displayed on the display screen by a digital camera, to fit it within a simultaneously displayed bounding shape. For example, the face bounding shape can be an oval, circle, square, or rectangle. As a response to the face bounding shape challenge, a set of digital images can be received from the personal computing device. The set of images can be analyzed by a motion-based model to determine liveness of a face detected/tracked in the set of images.

In some examples, an active technique encompasses a color light pattern liveness challenge. Like the face bounding shape challenge, the color light pattern challenge can be presented on the display screen of the personal computing device. The color light pattern challenge can encompass a set of different colors displayed on the display screen. When the set of colors are displayed on the display screen, the light emitted from the display screen can be reflected off the user's face. The face-reflected light can be captured by the digital camera. As a response to the color light pattern challenge, a set of images can be received from the personal computing device. The set of images can be analyzed by a face-reflected light model to determine if a face detected/tracked in the set of images is genuine or not.

A passive technique can determine liveness without requiring a face bounding shape challenge or a color light pattern challenge. In some examples, a passive technique encompasses a face-based liveness detection model. A set of one or more images can be received from the personal computing device. A face image can be classified as to liveness using the face-based model.

In some examples, a passive technique encompasses a context-based liveness detection model. A set of one or more images that contain a face with background can be received from the personal computing device. A face with background image can be classified as to liveness using the context-based model.

In another aspect, techniques for liveness detection using a motion, face, and context cues are also disclosed. The techniques for liveness detection using a motion, face, and context cues can encompass use of a combination of the face bounding shape challenge with the motion-based model, the face-based model, and the context-based model. The techniques for liveness detection using a motion, face, and context cues can also be used in conjunction with the color light pattern challenge with the face-reflected light model.

In yet another aspect, techniques for liveness detection using display screen light reflections are also disclosed. The techniques for liveness detection using display screen light reflections can encompass use of the color light pattern challenge with the face-reflected light model. The techniques for liveness detection using display screen light reflections also can be used in conjunction of one or more of: the face bounding shape challenge with the motion-based model, the face-based model, or the context-based model.

Any of the disclosed techniques may be used in lieu or conjunction with existing or other techniques for liveness detection.

High-Level Face Authentication Process

FIG. 1 is a diagram of a high-level face authentication computer system in the context of a provider network environment, according to some examples. High-level steps of a face authentication process are represented in FIG. 1 by numbered circles. Directional arrows in FIG. 1 represent a direction of data flow between respective components within the system but not necessarily the exclusive direction. Data that flows between depicted components can traverse one or more intermediate components (e.g., network devices or other computing devices). Such an intermediate component may not be depicted in FIG. 1 for the purpose of providing a clear example.

At a high-level, the system can have various components including front end 102 and back end 104. Front end 102 and back end 104 can be interconnected by a set of one or more intermediate networks 106. A network in the set of intermediate networks 106 can be any suitable data communications network such as, for example, a suitable wired or wireless data communications network. Non-limiting examples of such a network include a wired or wireless Personal Area Network (PAN), a wired or wireless Local Area Network (LAN), a Virtual Private Network (VPN), a Campus Area Network (CAN), a Metropolitan Area Network (MAN), an Enterprise Private Network (EPN), a Home Area Network (HAN), a Wide Area Network (e.g., the Internet), etc.

Front end 102 can encompass personal computing device 110, video display screen 112, and digital camera 114. User 108 can be a genuine user or an attacking user. An attacking user can be a user that uses device 110 to impersonate another user (impersonated user) using a presentation attack, an injection attack, or a deepfake attack. A genuine user can be a user that uses device 110 that is not an attacking user.

In the case of a presentation attack, the face of the impersonated user can be depicted by a physical presentation attack instrument. The presentation attack instrument can be presented to camera 114 by an attacking user to attempt to cause liveness detection service 116 to determine that the presentation attack instrument is a genuine face. For example, the presentation attack instrument might be a printed paper that depicts the impersonated user's face, a video display screen that displays an image or a video of the impersonated user's face, or a mask of the impersonated user worn by the attacking user. A set of one or more images of the presentation attack instrument captured by camera 114 can be sent from device 110 to liveness detection service 116. If liveness detection service 116 determines that a detected/tracked face in the set of images that is a genuine face, then the presentation attack can be successful.

In the case of an injection attack, the face of an impersonated user can be depicted in a set of one or more images that are pre-generated or pre-recorded prior to initiation of the face authentication process or generated in real time during the face authentication process. The set of images can be sent from device 110 to liveness detection service 116. If liveness detection service 116 determines that a detected/tracked face in the set of images is a genuine face, then the injection attack can be successful.

In the case of a deepfake attack, a set of one or more target images containing a synthetically generated face of an impersonated user can be generated in real-time during the face authentication process using deep artificial intelligence techniques. A deepfake attack can additionally or alternatively include use of a deep artificial intelligence image relighting technique to synthetically relight a face in an input image to produce an output image of a relit face or to generate a relit image corresponding to a rotation of the original illumination of an input image. The set of images can be sent from device 110 to liveness detection service 116. If liveness detection service 116 determines that a detected/tracked face in the set of images is a genuine face, then the deepfake attack can be successful.

To combat these and other attacks, when user 108 commences the face authentication process, liveness detection service 116, at Step 1, can generate and send a liveness challenge to personal computing device 110. As an alternative, the liveness challenge or portion thereof can be generated at device 110 instead of being generated by liveness detection service 116. Techniques for generating various liveness challenges including the color light pattern challenge and the face bounding shape challenge are described in greater detail elsewhere herein.

At Step 2, personal computing device 110 can present the liveness challenge to user 108 on screen 112. For example, device 110 can present the face bounding shape challenge or the color light pattern challenge. In some examples, device 110 presents just the face bounding shape challenge during the face authentication process. In some examples, device 110 presents just the color light pattern challenge during the face authentication process. In some examples, device 110 does not present either the face bounding shape challenge or the color light pattern challenge during the face authentication process. In some examples, device 110 presents both the face bounding shape challenge and the color light pattern challenge during the face authentication process.

At Step 3, user 108 can provide a response to the liveness challenge. The response can be captured and encoded at device 110 as a set of one or more digital images. The response may vary depending on the liveness challenge. For the face bounding shape challenge, the response by user 108 can include user 108 moving their face as displayed on screen 112 to tightly fit within a face bounding shape displayed on screen 112. For the color light pattern challenge, the response by user 108 can include user 108 holding their face still while facing camera 114 and screen 112 and while a color light pattern is displayed on screen 112. Other responses by user 108 might include blinking of the eyes or mouthing words as instructed by the liveness challenge.

In this disclosure, the term "digital image" or "image" refers broadly to data, including any lossless or lossy encoded or compressed variant of the data, that numerically represents a set of picture elements or "pixels." For example, an image can be a Red, Green, and Blue (RGB) image where each pixel is represented by at least three numerical values, one for each of the red, green, and blue channels. Or an image can be a greyscale image where each pixel is represented by at least a numerical value representing the light intensity of the pixel. The data that numerically represents a set of pixels of an image can be video frame data such as, for example, intraframe (I-frame) data, predicted frame (P-frame) data, or bidirectionally predicated frame (B-frame) data. For example, a set of images can be sent from device 110 over intermediate network(s) 106 to liveness detection service 116 encoded as MP4 video or the like. Liveness detection service 116 or other component of provider network 110 can decode the MP4 video to obtain the set of images on which liveness analysis can be conducted.

At Step 4, a set of "target" images can be sent by device 110 to liveness detection service 116. As used herein, a "target" image encompasses an image that is the subject of a liveness detection analysis. A target image can be an image captured by camera 114, a pre-recorded or pre-generated image or an image generated in real time as in an injection attack, or an image generated using deep artificial intelligence techniques as in a deepfake attack. For example, the set of target images can be streamed from device 110 to liveness detection service 116 as camera 114 captures the response by user 108 to the liveness challenge. In the case user 108 is an attacking user, some or all of the images in the set of target images sent by device 110 to liveness detection service 116 may be based on a presentation attack, an injection attack, or a deepfake attack.

At Step 5, liveness detection service 116 can determine whether a face detected/tracked in the set of target images is a genuine face. Various techniques that can be employed by liveness detection service 116 to determine whether a detected/tracked face in the set of target images is a genuine face are described in greater detail elsewhere herein.

If liveness detection service 116 determines that a detected/tracked face is a genuine face, then, at Step 6, liveness detection service 116 can provide face authentication data to face recognition service 118 by which face recognition service 118 can authenticate the detected/tracked face (e.g., determine an identity of the detected/tracked face). The provided face authentication data can include any data based on which face recognition service 118 can use to determine whether the detected/tracked face is a known face or an unknown face. For example, the provided authentication data can include one or more of the target images, a representative image of the detected/tracked face derived from a target image, an embedding (e.g., a matrix of numbers) representing the detected/tracked face, or other suitable authentication data.

On the other hand, if liveness detection service 116 determines that the detected/tracked face is not a genuine face, then, at Step 7, liveness detection service 116 can provide data to device 110 that indicates that the face authentication process failed.

A role of liveness detection service 116 within provider network 100 can be to ensure that face recognition service 118 authenticates only genuine detected/tracked faces. In this sense, liveness detection service 116 can be viewed as a protective screen or filter on the detected/tracked faces that are permitted to be authenticated by face recognition service 118. Thus, liveness detection service 116 can be programmed or configured with techniques that focus on discriminating between genuine detected/tracked faces and not genuine (e.g., impersonated) detected/tracked faces without regard to the identity of the detected/tracked face depicted (e.g., whose face it is). And face recognition service 118 can be programmed or configured with techniques that focus on ascertaining the identity of the detected/tracked face assuming liveness detection service 116 has already determined that the detected/tracked face is genuine.

While personal computing device 110 is depicted in FIG. 1 as a smartphone or the like, personal computing device 110 can be another type of personal computing device such as, for example, a desktop computer (PC), a laptop computer, a tablet computer, a smart television or other smart in-home device, an in-vehicle computing device, or other type of personal computing device.

Display screen 112 can be a standard RGB output device or television or video display or the like such as, for example, a Cathode-Ray Tube (CRT), Liquid Crystal Display (LCD), plasma, organic light-emitting diode (OLED), quantum dot, or type of RGB television set, computer or smartphone display, multicolor Light Emitting Diode (LED) display, etc. While screen 112 can be integrated in the form factor of device 110 such as depicted in FIG. 1, screen 112 can be a peripheral device such as, for example, a desktop computer monitor attached to device 110 by a physical cable.

Camera 114 can be a standard RGB input device or color television or video camera or the like such as, for example, a digital camera based on charge-coupled device (CCD) or complementary metal-oxide semiconductor (CMOS) technology. Camera 114 can operate according to the RGB color model or a variation thereof (e.g., using a Bayer filter arrangement). For example, camera 114 can be a standard visible light smartphone camera, webcam, IP camera, etc. Like screen 112, camera 114 can be integrated into the form factor of device 110 or attached by cable or wireless connection to device 110. In some examples, both screen 112 and camera 114 are oriented in the same or approximately the same direction such that when the face of user 108 is facing screen 112, then user 108 is also facing the lens of camera 114.

In the case where user 108 is an attacking user, a standard RGB input device can be mimicked by virtual camera software. Thus, unless the context clearly indicates otherwise, reference herein to camera 114 encompasses both a standard RGB input device like one of those described in the preceding paragraph and a virtual camera such as a virtual camera implemented by virtual camera software. Accordingly, unless the context clearly indicates otherwise, reference herein to a target image captured by camera 114 encompasses a target image captured by a standard RGB input device such as one of those described in the preceding paragraph or a target image produced or generated by a virtual camera such as a virtual camera used in an injection or deepfake attack.

Back-end 104 encompasses liveness detection service 116 and face recognition service 118 of provider network 100. Each of liveness detection service 116 and face recognition service 118 can be implemented by one or more computing devices of provider network 100. Liveness detection service 116 can encompass instructions configured when executed to perform the liveness detection techniques disclosed herein.

Provider network 100 is programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over one or more intermediate network(s) 106 and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand. There can be a sense of location independence in that the user generally can have no control or knowledge over the exact location of provided resources but can specify location at a higher level of abstraction such as, for example, at the level of a country, state, or datacenter.

Provider network 100 can automatically control and optimize resource use by leveraging a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability is provided to a user using the provider's software applications running on the infrastructure of provider network 100. The applications can be accessible from various client devices through either a thin client interface such as a web browser, or a program interface. The infrastructure includes the hardware resources such as server, storage, and network components and software deployed on the hardware infrastructure that are necessary to support the services being provided.

Typically, under the SaaS model, the user does not manage or control the underlying infrastructure including network, servers, operating systems, storage, or individual application capabilities, except for limited user-specific application configuration settings. With PaaS, the user is provided the capability to deploy onto hardware and software infrastructure of provider network 100 user-created or acquired applications using programming languages, libraries, services, and tools supported by the provider or other sources.

Typically, under the PaaS model, the user does not manage or control the underlying hardware and software infrastructure including network, servers, operating systems, or storage, but has control over the deployed applications and possibly configuration settings for the application-hosting environment.

With IaaS, the user is provided the capability to provision processing, storage, networks, and other fundamental computing resources where the user can deploy and run arbitrary software, which can include operating systems and applications. The user does not manage or control the underlying hardware and software infrastructure but has control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 is provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 is provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure is provisioned for open use by the public. The public cloud can be owned, managed, and operated by a business, academic, or government organization, or some combination of them. A public cloud exists on the premises of the public cloud provider.

In a hybrid cloud, the infrastructure is a composition of two or more distinct cloud infrastructures (private, community, or public) that remain unique entities, but are bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100, which in turn uses one or more compute resources to execute the code-typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across intermediate network(s) 106 (e.g., the internet, a cellular network, etc.) via an interface, such as through use of an application programming interface (API) call, via a console implemented as a website or application, etc.

An API refers to an interface or communication protocol between a client and a server, such that if the client makes a request in a predefined format, the client should receive a response in a specific format or initiate a defined action. In context of provider network 100, an API provides a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Liveness Detection Using Display Screen Reflections

According to some examples, a defense against presentation, injection, and deepfake attacks using display screen light reflections is provided. Specifically, screen 112 can be used to emit a color light pattern challenge. The color light pattern challenge can be reflected by the face of user 108. Camera 114 can capture the reflection of the color light pattern challenge off the face of user 108 in a set of target images. The set of target images can be sent to liveness detection service 116 for analysis to determine whether a detected/tracked face in the set of target images is a genuine or not. Where user 108 is genuine, the color, luminance, and luminance gradients of the face-reflected light in the set of target images should correspond to the color, luminance, and luminance gradients of the color light pattern challenge displayed on screen 112.

In some examples, the color, luminance, and luminance gradients of the color light pattern challenge displayed on screen 112 can be randomized to mitigate an injection attack and a deepfake attack. An injection attack and a deepfake attack can be mitigated because the randomized elements of the color light pattern challenge are not determinable at device 110 until the randomized elements are selected or presented on screen 112. As a result, the face-reflected light in a pre-generated injected image or deepfake image may not match the face-reflected light of the randomized color light pattern challenge or it can be more difficult or impractical to dynamically generate an injected image or deepfake image in real-time with face-reflected light that matches the face-reflected light of the randomized color light pattern challenge.

In some examples, upon receiving a set of target images from device 110, liveness detection service 116 can measure the correspondence between one or more of: (1) the colors of the face-reflected light in the set of target images and the colors of the color light pattern challenge, (2) the luminance of the face-reflected light in the set of target images and the luminance of the color light pattern challenge, and (3) the luminance gradients of the face-reflected light in the set of target images and the luminance gradients of the color light pattern challenge. If user 108 is genuine, then all of these should correspond. If one or more do not correspond, then user 108 may be an attacking user.

When the color light pattern challenge is presented on screen 112, camera 114 can capture the light from screen 112 that is reflected by the face of user 108. Image sensors of camera 114 can correspond to a set of pixels. The set of pixels can capture the light emitted from screen 112 reflected off the face of user 108 to form an image. Each pixel x of the image on the face can represent an intensity response of the corresponding sensor of the incoming light. The pixel light intensity response of a camera pixel x on the face can be approximated in some examples with a linear diagonal map based on the Von Kries coefficient law as follows:

$$I_c(x)=E_c(x) \times R_c(x), c \in \{R,G,B\}$$

Here, the variable x can represent a camera pixel on the face of user 108. The variable $E_c$ can represent the illuminant spectral power distribution of the color channel c (e.g., red, green, or blue). The variable $R_c$ can represent the reflectance of the color channel c.

The light intensity response of pixel x can be triggered by multiple illuminant sources including the light emitted from screen 112 reflected off the face of user 108 and the ambient lighting of the environment where user 108 is physically located. Assuming user 108 is facing both screen 112 and camera 114, the light intensity response for a camera pixel x on the face of user 108 is modeled in some examples as a linear combination of: (1) the light intensity response of the camera pixel x by the light of screen 112 reflected off the face of user 108 and (2) the light intensity response of the camera pixel x by the environmental illuminant sources excluding screen 112, as follows:

$$\hat{I}_c(x)=E_c^s(x) \times R_c(x)+E_c^e(x) \times R_c(x), c \in \{R,G,B\}$$

In this equation, the variable $E_c^s$ can represent the illuminant source from screen 112. The variable $E_c^e$ can represent illuminant sources in the environment where user 108 is located other than screen 112. From this equation, if the light intensity of screen 112 is varied while the light intensity of other illuminant sources in the environment stays relatively constant, then the light intensity response of a camera pixel capturing the varying light reflected off the face of user 108 can vary in proportion to the varying light intensity of screen 112. If user 108 is genuine, then the face of user 108 is likely to be a relatively close reflective object to screen 112. With this then, a genuine user can be distinguished from an attacking user by comparing the color, luminance, and transitions of face-reflected light in the set of target images with the color, luminance, and transitions of the color light pattern challenge emitted from screen 112.

Figure 2:
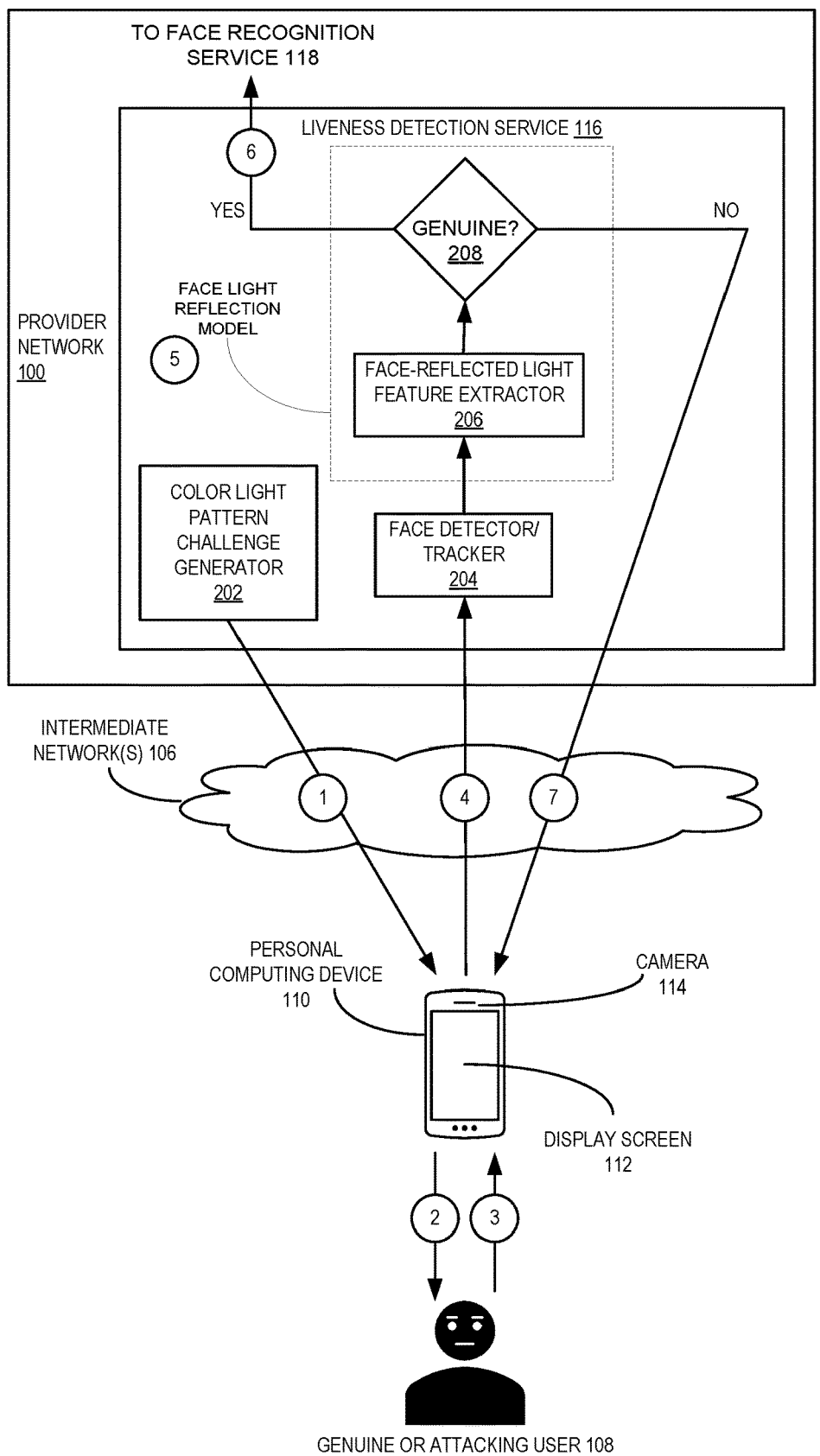
FIG. 2 depicts the face authentication computer system of FIG. 1 in which the liveness detection service can be programmed or configured to perform liveness detection using a face light reflection model, according to some examples.

FIG. 2 depicts the face-based authentication computer system of FIG. 1 and in which liveness detection service 116 can be programmed or configured to perform liveness detection using display screen light reflections, according to some examples. Using display screen light reflections for liveness detection is described below in the context of the high-level face authentication process described above with respect to FIG. 1. Like FIG. 1, steps of the face authentication process that uses display screen light reflections for liveness detection are depicted in FIG. 2 as numbered circles and directional arrows represent a direction of data flow between connected components but not necessarily the exclusive direction. Data represented by directed arrows in FIG. 2 that flows between depicted components can traverse one or more intermediate components (e.g., an intermediate network or computing device). Such an intermediate component may not be depicted in FIG. 2 for the purpose of providing a clear example.

Returning again to FIG. 2, at Step 1, color light pattern challenge generator 202 can be programmed or configured to select a set of one or more colors to display on screen 112. The color light pattern challenge can include a set of randomly selected colors. Each color can be defined by a Red, Green, and Blue (RGB) value. In some examples, colors to include in the color light pattern are randomly selected from the following set of possible colors: red (255, 0, 0); orange (255, 165, 0); yellow (255, 255, 0); lime green (0, 255, 0); green (0, 128, 0); cyan (0, 255, 255); blue (0, 0, 255); purple (128, 0, 128); violet (143, 0, 255); white (255, 255, 255), and black (0, 0, 0). However, instead of selecting from a set of discrete colors, colors can be randomly selected within a range of one or more of the individual red, green, or blue color channel values.

The color light pattern challenge can also encompass a sequence (ordering) of the selected colors. The sequence can correspond to the order in which the colors are displayed on screen 112. Different combinations are possible. For example, the sequence can be selected by ordered sampling with replacement. In this case, the probability of correctly guessing the sequence can be 1 in $N^K$ where N represents the number of possible colors and K represents the length of the color light pattern challenge in which colors can be repeated. Thus, for a five-element color light pattern challenge selected by ordered sampling with replacement from nine possible colors, the probability of correctly guessing the sequence is 1 in 9⁵, or 1 in 59,049.

In some examples, using the color light pattern challenge for liveness detection is just one of set of multiple challenges presented to user 108 at Step 2. In combination, the combination of challenges can decrease the probability that an attacking user can successfully authenticate as an impersonated user relative to using a single challenge or fewer challenges. For example, the color light pattern challenge can be combined with one or more other challenges such as requesting user 108 to blink their eyes, read words or numbers aloud, or move their head. In some examples described in greater detail elsewhere herein, user 108 can be requested to position their face within a face bounding shape (e.g., an oval) displayed on screen 112. Once user 108 has positioned their face within the face bounding shape or while user 108 is positioning their face within the shape, the color light pattern challenge can be presented on screen 112. The combination of challenges can make it more difficult for an attacking user to impersonate the face of another user while successfully meeting both challenges compared to the difficulty of having to only meet one of the challenges alone.

Figure 3:
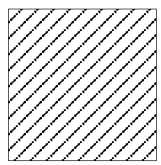
FIG. 3 illustrates some possible color light patterns for performing liveness detection using display screen light reflections, according to some examples.
Figure 3:
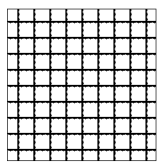
Figure 3:
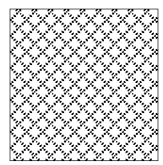
Figure 3:
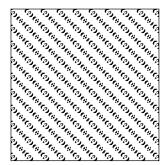
Figure 3:
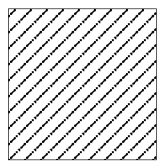
Figure 3:
Figure 3:
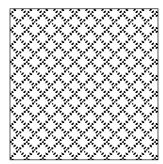
Figure 3:
Figure 3:
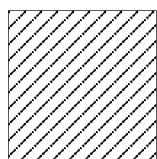
Figure 3:
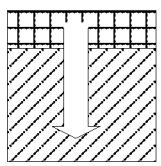
Figure 3:
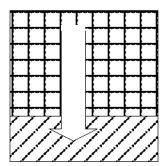
Figure 3:
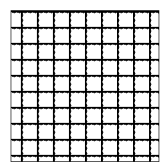
Figure 3:
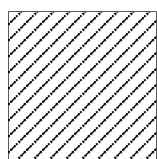
Figure 3:
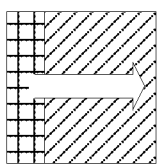
Figure 3:
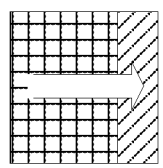
Figure 3:
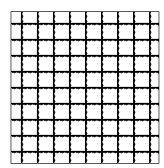

Various color light pattern challenges are possible. FIG. 3 depicts some possible color light pattern challenges, according to some examples. Different color elements are depicted by different fill patterns due to standard patent application drawings being limited to black and white coloring.

With cut pattern 302, the entire screen 112 or substantially the entire screen 112 can present a single-color element at a time. Transitions from one color element to the next color element in the sequence can be made by hard cutting from one color element to the next. Each color element can be displayed on screen 112 for a short period of time. No particular length of time is required and the length of time for which a color element is displayed on screen 112 can be selected according to the requirements of the particular implementation at hand.

Various factors can affect the selection of the length of time for which a color element is displayed. For example, the length of time can be selected to reduce the risk of triggering photosensitive epilepsy or otherwise physically disturbing user 108 from too rapid of transitions between different color elements. The length of time can also be selected so that a color element is displayed on screen 112 for at least multiple video frames captured by camera 114 in case some of the video frames are unusable because user 108 was moving their head, scratching their nose, or otherwise interfering with the face-reflection of the displayed color element.

In example cut pattern 302, a first color element is displayed on screen 112 at time T1, a second color element is displayed on screen 112 at time T2 that immediately follows time T1, a third color element is displayed on screen 112 at time T3 that immediately follows time T2, and a fourth color element is displayed on screen 112 at time T4 that immediately follows time T3. While four color elements are depicted in example cut pattern 302, fewer or more color elements can be displayed on screen 112 in a cut pattern.

With cut pattern with gap 304, the entire screen 112 or substantially the entire screen 112 can present one color element at a time like with cut pattern 302. However, the sequence can alternate between highly reflective color elements and less reflective color elements. By alternating so, greater reflective contrast can be provided between color elements. In some examples, the highly reflective color elements can be selected from a set that includes orange, red, cyan, yellow, green, blue, and purple and where the less reflective color element is black. In some examples, the highly reflective color elements can be selected from a set that includes orange, red, cyan, and yellow and the less reflective color elements can be selected from a set that includes green, blue, and purple. White can also be used as a highly reflective color element.

Horizontal wipe pattern 306 can be an animated pattern where transitions between successive color elements can be made according to horizontal wipe transition from the current color element to the next color element in the color light pattern challenge. Vertical wipe pattern 308 can be like pattern 306 except transitions can be animated using vertical wipe transitions as opposed to horizontal wipe transitions. A diagonal wipe pattern is also possible. It is also possible for a color light pattern challenge to contain some mix of horizontal, vertical, or diagonal wipe transitions.

In any case, with a wipe pattern, the next color element in the color light pattern challenge can be animated in a wipe transition to overtake the currently displayed color element until the next color element occupies entirely all or substantially all of screen 112. This process can repeat with any additional color element in the sequence until all color elements in the sequence are displayed on screen 112.

Before the animated transition to the next color element in the sequence is started, the current color element can be displayed on screen 112 for a short period of time, or the wipe transition to the next color element can start as soon as the prior transition completes. The rate of the transition can be selected based on various factors according to the requirements of the particular implementation at hand. No particular transition rate is required.

For example, the transition rate can be selected to reduce the triggering photosensitive epilepsy or otherwise physically disturbing user 108 from too rapid of transitions between different color elements. The transition rate can also be selected so that the wipe transition occurs over multiple video frames captured by camera 114 in in case some of the video frames are unusable because user 108 was moving their head, scratching their nose, or otherwise interfering with the face-reflection of the displayed color element.

In example horizontal wipe pattern 306, a first color element is displayed on screen 112 at time T1 and a second color element is animated in a wipe transition in the direction indicated by the arrow over times T2, T3, and T4 until the second color element occupies the entire screen 112 or substantially the entire screen 112. This can repeat for additional color elements. While in the example horizontal wipe pattern 306 the wipe transitions animate from the top of screen 112 toward the bottom of screen 112, a horizontal wipe pattern can also transition from the bottom of screen 112 toward the top of screen 112.

Vertical wipe pattern 308 is like horizontal wipe pattern 306 except that the wipe transition is vertically oriented as opposed to horizontally oriented as in pattern 306. While in the example vertical wipe pattern 308 the wipe transitions animate from the left side of screen 112 toward the right side of screen 112, a vertical wipe pattern can also transition from the right side of screen 112 toward the left side of screen 112.

In a variation of a wipe pattern, to provide a greater luminance contrast between color elements, each color element can be transitioned in over a black or dark background displayed on screen 112 as opposed to the previous color element selected for inclusion in the color light pattern challenge.

In some examples, a wipe pattern can be used because it provides a face-reflected light gradient from a more reflective color element to a less reflective color element or from a less reflective color element to a more reflective color element for each wipe transition in the sequence. The face-reflected light gradient results from the animated wipe transition where a first color element having a first luminance is gradually replaced during the transition with a second color element having a second luminance that is lower or higher than the first luminance. This face-reflected light gradient can be captured by camera 114. Liveness detection service 116 can determine the liveness of a detected/tracked face in a set of target images received from front-end 102 by measuring the correspondence between the luminance gradients of the color light pattern challenge emitted from screen 112 and the luminance gradients of the face-reflected light in the set of target images.

Where a wipe pattern is used for the color light pattern challenge, this measuring can include measuring the correspondence between luminance gradients of the wipe transitions in the color light pattern challenge emitted from screen 112 and the luminance gradients of the face-reflected light in the set of target images. By doing so, mounting a successful injection attack or deepfake attack can be made more improbable.

Returning to FIG. 2, at Step 2, the color light pattern challenge can be displayed on screen 112. At Step 3, the response to the display of the color light pattern sequence can be captured by camera 114 as a set of target images. If user 108 is genuine, then the set of target images can include the face-reflected light from the face of user 108 that is caused by the display of the color light pattern sequence on screen 112 while user 108 is facing screen 112 and camera 114. If user 108 is an attacking user, then the set of target images can include one or more images based on a presentation, injection, or deepfake attack.

At Step 4, the set of target images can be sent from front-end 102 to back end 104. The set of target images can be sent (streamed) from front end 102 to back end 104 in real-time in Step 4 as the color light pattern challenge is displayed on screen 112 in Step 2 and as the response by user 108 is captured by camera 114 at Step 3.

Figure 4:
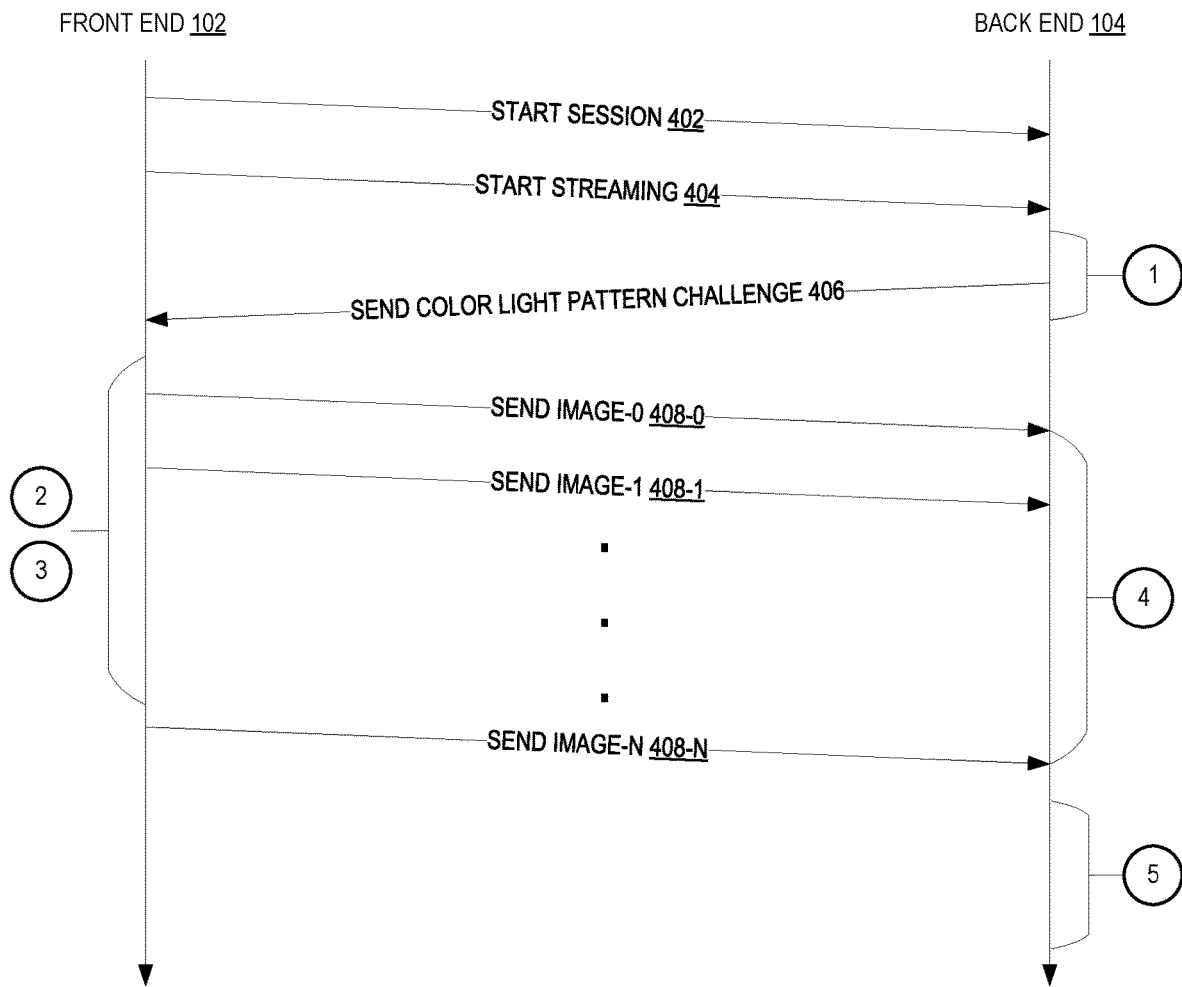
FIG. 4 illustrates an example of unidirectional streaming between a front end and a back end in the context of a color light pattern challenge, according to some examples.

FIG. 4 is an interaction diagram depicting a possible interaction between front end 102 and back end 104 for a color light pattern challenge and with reference to Steps of FIG. 2. Front end 102 starts 402 a face authentication session with back end 104. After the start of the session, camera 114 can be activated at front end 102 and can begin capturing images. The captured images can be streamed 404 from front end 102 to back end 104. Meanwhile, in response to start 402 of the face authentication session, back end 104 can generate a color light pattern challenge in Step 1. Back end 104 can send 406 information to front end 102 about the color light pattern challenge such as the color elements selected for inclusion in the challenge and the presentation order of the selected color elements. While the color light pattern challenge is presented on screen 112 in Step 2, user 108 can respond to the challenge in Step 3 and front end 102 can send 408 a set of target images captured by camera 114 to back end 104 in Step 4. After the set of target images are received, back end 104 can conduct a liveness analysis of the set of target images in Step 5.

As an alternative, the information about the color light pattern challenge can be streamed from back end 104 to front end 102 in Step 1 of FIG. 2 while target images are streamed from front end 102 to back end 104 in Step 4 of FIG. 2. Furthermore, the liveness analysis can be conducted in Step 5 as target images are received at back end 104 from front end 102. This bidirectional streaming allows back end 104 to stop the face authentication process as soon as the liveness analysis at Step 5 of FIG. 2 determines that user 108 is not genuine which can be before presentation of the entire color light pattern challenge in Step 2.

Figure 5:
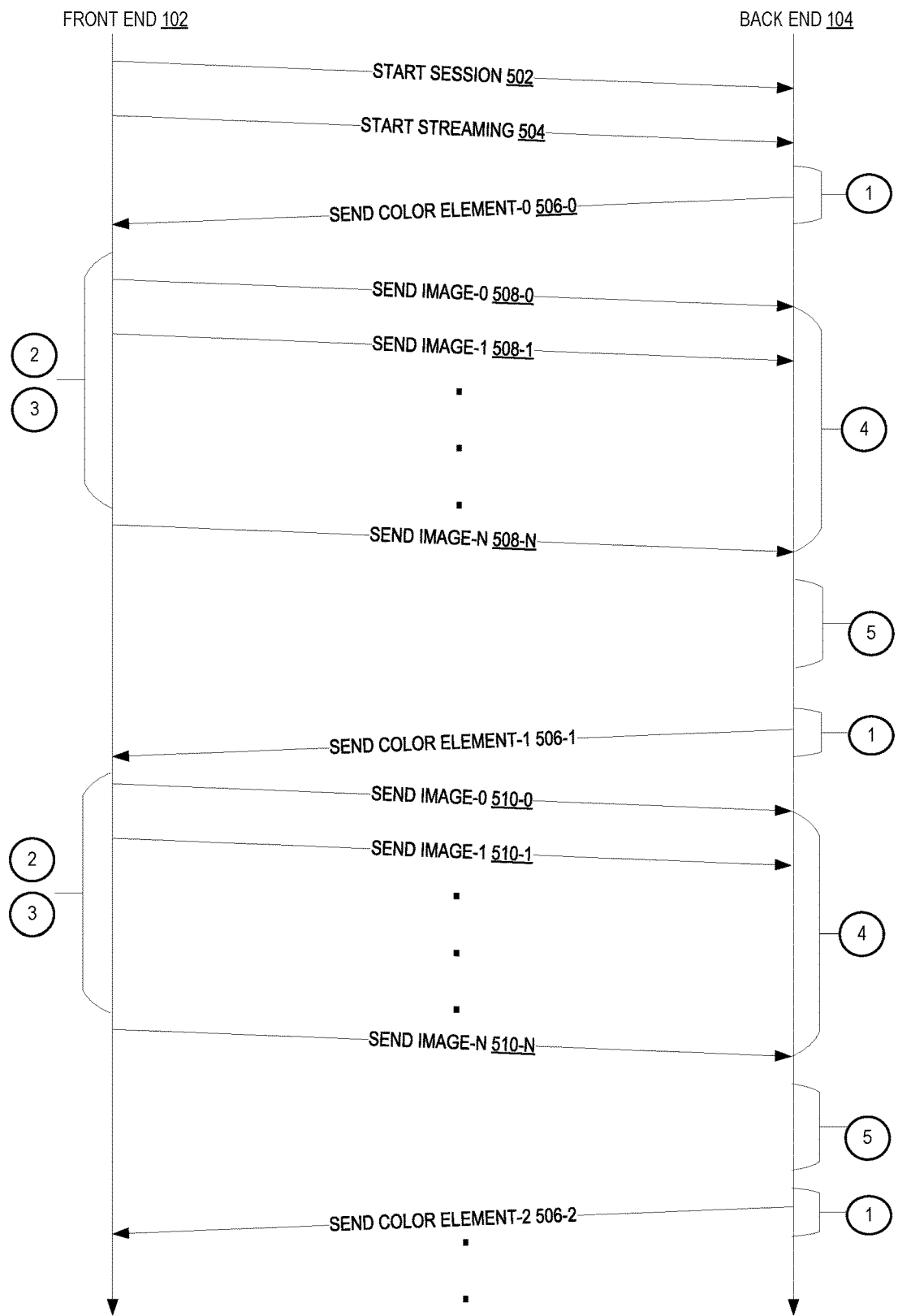
FIG. 5 illustrates an example of bidirectional streaming between a front end and a back end in the context of a color light pattern challenge, according to some examples.

FIG. 5 is an interaction diagram depicting a possible interaction between front end 102 and back end 104 for a color light pattern challenge and with reference to Steps of FIG. 2. Front end 102 starts 502 a face authentication session with back end 104. After the start the session, camera 114 can be activated at front end 102 and begin capturing images of user 108. The captured images can be streamed 504 from front end 102 to back end 104. Meanwhile, in response to start 502 of session, back end 102 can generate and send 506-0 a first color element selected for inclusion in the color light pattern challenge to front end 102 in Step 1. While the first color element is presented on screen 112 in Step 2, user 108 can respond to the challenge in Step 3 and front end 102 can send 508 a set of target images captured by camera 114 to back end 104 in Step 4. After the set of target images for the first color element is received, back end 104 can conduct a liveness analysis of the set of target images sent 508 in response to presentation of the first color element in Step 5. If back end 104 determines that user 108 is genuine based on analysis of the set of target images sent 508 for the first color element, then back end 104 can send 506-1 a second color element selected for inclusion in the color light pattern challenge to front end 102 in Step 1.

While the second color element is presented on screen in Step 2, user 108 can respond to the challenge in Step 3 and front end 102 can send 510 a set of target images captured by camera 114 to back end 104 in Step 4. After the set of target images for the second color element are received at back end 104, back end 104 can conduct a liveness analysis of the set of target images sent 510 in response to presentation of the second color element at front end 102 in Step 5. If back end 104 determines that user 108 is still genuine based on analysis of the set of target images sent 510 for the second color element, then back end 104 can send 506-2 a third element selected for inclusion in the color light pattern challenge to front end 102 in Step 1. This may repeat for additional color elements selected for inclusion in the color light pattern challenge.

With the bidirectional streaming, a liveness analysis can be conducted at back end 104 after the presentation of each color element of the color light pattern challenge at front end 102 based on the set of target images that have been received for the color light pattern challenge so far by back end 104. Back end 104 can stop and reject the face authentication process in Step 7 if back end 104 determines that user 108 is not genuine based on the set of target images received so far. This just-in-time stoppage can conserve computing resources of back end 104 by avoiding performance of an unnecessary liveness analysis based on target images when it has already determined by back end 104 that user 108 is not genuine based on the color elements presented and the target images received and analyzed so far.

While in some examples of bidirectional streaming color elements of the color light pattern challenge can be sent separately from liveness detection service 116 to device 110 such as depicted in FIG. 5, all color elements of the color light pattern challenge are sent at the start of the face authentication session from liveness detection service 116 to device 110 before presentation of the color light pattern challenge at device 110 begins in other examples. In this case, liveness detection service 116 can still conduct a liveness analysis on received images as the images are received at liveness detection service 116 and liveness detection service 116 can still stop the face authentication process as soon it is determined that user 108 is not genuine.

In addition, the bidirectional streaming also facilitates timing verification by back end 104. Timing verification can be useful to detect injection or deepfake attacks. In the absence of an attack, back end 104 should receive a target image reflecting a next color element from front end 102 soon after information about the next color element of the color light pattern challenge to display is sent from back end 104 to front end 102. In the absence of an attack, the time delay between (1) the time when back end 104 sends information about the next color element to front end 102 and (2) the time thereafter when a target image reflecting the next color element is received at back end 104 should be mostly affected by the delay of the network (e.g., 106) connecting front end 102 and back end 104. However, in the event of an injection or deepfake attack, some additional delay may be incurred at front end 102 generating an injected image or a deepfake image that reflects the next color element.

In some examples, the inter-arrival times of target images streamed from front end 102 at back end 104 are determined by back end 104. The inter-arrival times are analyzed by back end 104 to identify any anomalous inter-arrival times that are indicative of a delay at front end 102 caused by generating an injected image or a deepfake image. In some examples, back end 104 determines the inter-arrival time between consecutive target images received at back end 104 to determine if the inter-arrival time is anomalous compared to a baseline inter-arrival time. For example, the baseline inter-arrival time can be empirically determined or can be a mean inter-arrival time or other summary statistic of target images received so far for the color light pattern challenge. In any case, the baseline inter-arrival time can reflect a network delay of intermediate network 106 between sending a target image from front end 102 and receiving the target image at back end 104. When a target image is received at back end 104 for the color light pattern challenge, back end 104 can determine an arrival time of the target image and compute the difference from the arrival time at back end 104 of a previous target image received at back end 104 for the color light pattern challenge. If the difference is significantly greater (e.g., more than two standard deviations greater) than the baseline inter-arrival time, then back end 104 can determine that an injection attack or deepfake attack is underway. In this case, back end 104 can stop the face authentication process and inform front end 102 that the face authentication process failed in Step 7.

Returning now to FIG. 2, at Step 5, a set of target images can be processed by liveness detection service 116 to detect the liveness of a detected/tracked face in the set of target images. At a high-level, this processing can include detecting or tracking the face in the set of target images by face detector/tracker 204; extracting 206 color, luminance, or luminance gradient features from pixels on the detected/tracked face in the set of target images; and making 208 a liveness determination as to whether the detected/tracked face is genuine or not based on the extracted features.

If the detected/tracked face is determined 208 by liveness detection service 116 to be genuine, then, at Step 6, the set of target images or data based thereon can be forwarded to face recognition service 118 to determine the identity of the detected/tracked face. On the other hand, if the detected/tracked face is determined 208 by liveness detection service 116 to not be genuine, then, at Step 7, data can be sent to device 110 indicating that the face authentication process failed.

Face detector/tracker 204 can be programmed or configured to detect or track a face in the set of target images. Here, detection can encompass determining the location of a detected face in a target image and tracking can encompass determining the location of a tracked face in each of a set of target images. A location of a detected/tracked face in a target image can be identified by coordinates of a bounding box around the detected/tracked face in the target image.

Face detector/tracker 204 can be programmed or configured to detect or track a face in the set of one or more target images using a variety of different computer vision techniques including techniques that employ a deep neural network trained for face detection or face tracking. No particular face detection or tracking technique is required. In some examples, if multiple faces are detected in the same target image, then liveness detection service 116 can stop the face authentication process as only one genuine user should be attempting to authenticate.

Face detector/tracker 204 can also be programmed or configured to perform face landmark identification on the target face detected or tracked in the set of target images. Face landmark identification can encompass identifying locations (sometimes called "face landmarks" or just "landmarks") in a target image containing a detected/tracked face that exist on virtually every human face such as the top of the chin, the outside edge of each eye, the inner edge of each eyebrow, etc.

In some examples, face landmark identification is performed following face detection or tracking. Alternatively, face landmark identification and face detection or tracking can be performed simultaneously. For example, a set of one or more deep neural networks may be jointly trained to perform both face detection or tracking and face landmark detection on an input set of target images.

The output of face detector/tracker 204 may include bounding boxes for target images in the set of target images in which the target face is detected or tracked. Each bounding box may enclose the target face in a respective target image. The output for each such target image may also include a set of image coordinates (x, y coordinates) corresponding to identified face landmarks on the target face as depicted in the target image.

While in some examples face detection, face tracking, and face landmark identification is performed by liveness detection service 116, any or all of face detection, face tracking, or face landmark identification can be performed at device 110 to distribute compute workload over font end 102 and back end 104. In this case, device 110 can be programmed or configured with a set of one or more pre-trained machine learning models (e.g., a pre-trained deep neural network model). For example, device 110 can download the pre-trained models and software to execute the models from provider network 100. Device 110 can be programmed or configured to use the set of pre-trained machine learning models at device 110 to perform face detection, face tracking, or face landmark identification at device 110 based on a set of target images obtained at device 110. In this case, device 110 can send determined face bounding box information or face landmark identification information for a detected/tracked face to liveness detection service 116 at Step 4 along with the set of target images. The received bounding box information and face landmark identification information can be provided to face-reflected light feature extractor 206 without face detector/tracker 204 of liveness detection service 116 repeating face detection, face tracking, or face landmark identification operations that were already performed at device 110 as reflected by the resulting bounding box information or face landmark identification information provided by device 110 to liveness detection service 116 in Step 4.

A purpose of performing face landmark identification on a detected/tracked face in a target image can be to locate an area of the target image where the light from screen 112 should be adequately reflected off the face of user 108. Face-reflected light information for purposes of comparing with color, luminance, or luminance gradient information about the color light pattern displayed on screen 112 can be extracted from the pixels corresponding to located area of the face. Certain parts of the face such as the eyes or mouth might not adequately reflect the light from screen 112 because of movement such as blinking of the eyes or talking or occlusions such as caused by eyeglasses, mustaches, beards, etc.

In some examples, the bridge of the nose or the forehead above the eyebrows can be identified by face detector/tracker 204 based on face landmark identification. Face-reflected light information can be extracted one or both areas. For example, face detector/tracker 204 can be programmed or configured to apply a face detection/tracking algorithm to detect/track a face in the set of target images. For a target image in which a face is detected/tracked, face detector/tracker 204 can be programmed or configured to apply a face landmark identification algorithm to identify a set of one or more coordinates in the target image corresponding to the bridge of the nose or other landmark on the detected/tracked face. Face detector/tracker 204 can be programmed or configured to identify a set of one or more pixels corresponding to or based on the set of coordinates in the target image. For example, the set of one or more pixels can be a rectangular area of the target image bounding the bridge of the nose or other facial landmark area.

Feature extractor 206 can be programmed or configured to extract luminance information from the identified facial landmark area. In some examples, a luminance value is computed for a pixel in the area. The luminance value for the pixel can also be referred to in certain contexts as the luma of the pixel, the brightness of the pixel, or the lightness of the pixel. The luminance value for the pixel can be computed according to various luminance model functions capable of converting red, green, and blue color channel values of the pixel to a luma, intensity, brightness, or lightness value for the pixel according to a target luminance model. For example, the luminance model could be any of: a Hue, Saturation, and Value (HSV) color model where the Value (V) can be used as the luminance value; a Hue, Saturation, and Intensity (HSI) color model where the Intensity (I) can be used as the luminance value; a Hue, Saturation, and Lightness (HSL) color model where the Lightness (L) is used as the luminance value; or a perceptual lightness model in which a luma value computed as a weighted sum red, green, and blue color channel values is used as the luminance value and in which the weights can be selected based on a model of how humans perceive luminance.

Multiple luminance values can be computed for multiple pixels in the facial landmark area. In this case, a final, aggregated luminance value representing the face-reflected light can be computed as a mean, average, or other suitable statistical combination of the multiple individual luminance values.

Figure 6:
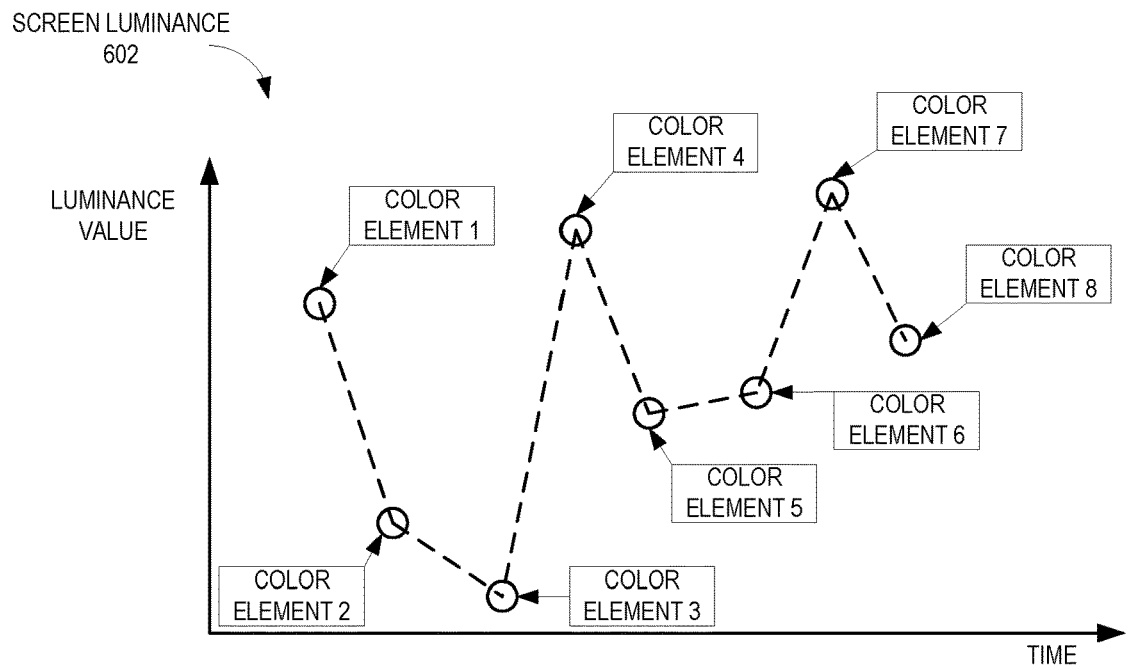
FIG. 6 illustrates an example correlation between display screen light luminance and face reflected light luminance, according to some examples.
Figure 6:
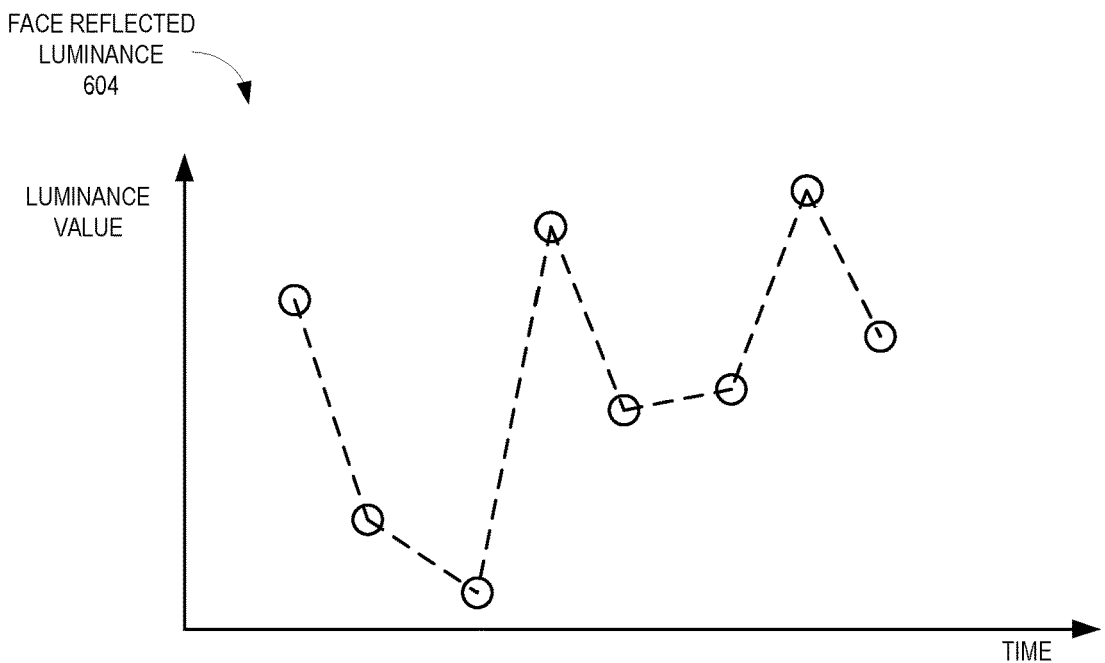

FIG. 6 illustrates screen luminance 602 of screen 112 over a time during which a color light pattern challenge is displayed on screen 112 and illustrates face-reflected luminance 604 of light reflected off the genuine face of user 108 over the same time as captured by camera 114 in a set of target images. In this example, eight color elements are presented in the color light pattern and wipe transitions are used. The luminance of screen 112 decreases over time as a wipe transition is made from a higher luminance color to a lower luminance color and the luminance of screen 112 increases over time as a wipe transition is made from a lower luminance color to a higher luminance color. As shown, the luminance changes for screen luminance 602 and face reflected luminance 604 correspond when user 108 is genuine. Specifically, for each luminance change on screen 112, there is a corresponding luminance change in the face-reflected light in the target images.

When user 108 is a genuine user and not an attacking user, the number of significant luminance changes of the face-reflected light in the set of target images should be equal to the number of significant luminance changes in the color light pattern challenge that is displayed on screen 112. A significant luminance change corresponds to a difference in the screen luminance or the face-reflected luminance between two consecutive color elements in the color pattern sequence. For example, a significant luminance change can occur when a first color element is the sequence is displayed on screen 112 and then the next color element in the sequence is displayed on screen 112. In the example of FIG. 6, there are seven significant luminance changes in screen luminance 602.

In some examples, liveness detection service 116 can be programmed or configured to determine the number of significant luminance changes in the face-reflected light in the set of target images and the number of significant luminance changes in the color light pattern challenge that is displayed on screen 112. Liveness detection service 116 may be further programmed or configured to determine, at operation 208, if the numbers of significant luminance changes are equal. If not equal, then liveness detection service 116 can determine that user 108 is not a genuine user (e.g., is an attacking user). In some examples, equality between the numbers of significant luminance changes is required for liveness detection service 116 to determine that user 108 is a genuine user. In some examples, a tolerance is allowed. For example, in some examples, liveness detection service 116 can determine that user 108 is a genuine user if the numbers of significant luminance changes are within one, two, or a few of each other. Whether and the extent of a tolerance is permitted depends on a tradeoff between potentially increasing false negative liveness determinations with a higher tolerance and potentially increasing false positive liveness determinations with no or a low tolerance.

In some examples, in addition to determining if the number of significant luminance changes correspond, liveness detection service 116 can be programmed or configured to determine if the luminance gradients between the significant luminance changes correspond. In some examples, a luminance gradient is either decreasing in luminance or increasing in luminance. For example, in the example of FIG. 6, the luminance gradients in order of the seven significant luminance changes over time are as follows: (1) decreasing, (2) decreasing, (3) increasing, (4) decreasing, (5) increasing, (6) increasing, and (7) decreasing. In the example of FIG. 6, the luminance gradients between screen luminance 602 and face reflected luminance 604 match.

There can be other ways used by liveness detection service 116 to determine correspondence between a screen luminance pattern (e.g., 602) and a face reflected luminance pattern (e.g., 604). For example, a Pearson correlation coefficient may be computed between screen luminance pattern 602 and face reflected luminance pattern 604. For example, the variables in the coefficient calculation can be a series of luminance values for each of screen luminance 602 and face reflected luminance 604. In this case, liveness detection service 116 can be programmed or configured to determine that user 108 is not an attacking user if the Pearson correlation coefficient is one or close to one (e.g., greater than 0.8).

In some examples, a trained multi-class machine learning classifier is used to determine whether the colors of the face-reflected light in the set of target images correspond to the colors of the color light pattern challenge. The multiple classes can correspond to different possible colors that can be selected for inclusion in the color light pattern challenge. A set of one or more luminance values for face-reflected light in a target image or other face-reflected light features can be input to the classifier. The output of the classifier can be a color of the face-reflected light in the target image inferred by the trained classifier. This classification can be done for multiple target images ordered by time to produce a sequence of face-reflected light colors also ordered by time. If user 108 is genuine, then the order of colors in the sequence should correspond to the order of the colors presented in the color light pattern challenge. For example, if the presentation order of the colors in the color light pattern challenge is red, black, yellow, black, orange, then a sequence of colors output by the classifier should also be red, black, yellow, back, and orange. If the color orders do not match, then liveness detection service 116 can determine 208 that user 108 is not a genuine user.

Liveness detection service 116 can be programmed or configured to compute statistics for comparison from a set of receipt times for a set of pre-challenge target images and a set of receipt times for a set of challenge response target images. To prevent spoofing of the receipt times by the attacking user, back end 104 can determine the receipt times of target images according to a clock or counter at back end 104 that the attacking user does not have access to and cannot manipulate. A receipt time for a target image can correspond to a time when the video frame is received at back end 104. The statistic for comparison could be a standard deviation or a cumulative distribution function of the intervals between the set of receipt times or other suitable statistic that is based on the receipt intervals. In this case, liveness detection service 116 can be programmed or configured to determine that user 108 is an attacking user if there is a significant difference between the statistics computed for sets of target images, particularly where the statistics indicate that the receipt intervals for the pre-challenge target images are significantly shorter than the receipt intervals for the challenge response target images. The increased receipt intervals for the challenge-response target images can be due to the extra processing time incurred at front end 102 by attempting to generate injected target images or deepfake target images in real-time.

Liveness Detection Using Motion-Based Model

Using display screen reflections for liveness detection can be effective to prevent successful injection and deepfake attacks. However, they can be less effective against presentation attacks, especially if the attacking user wears a silicon mask or otherwise uses a presentation attack instrument that reflects light from screen 112 in a way that is analogous to face-reflected light. Liveness detection service 116 can be programmed or configured to use a motion-based model to counter presentation attacks.

In some examples, liveness detection service 116 can be programmed or configured to extract motion information about a detected/tracked face in the set of target images and determine liveness based on the extracted motion information. The motion information can be extracted from the set of target images using a motion-based model. The motion-based model can be based on optical flow, frame differencing, or other motion model.

Figure 7:
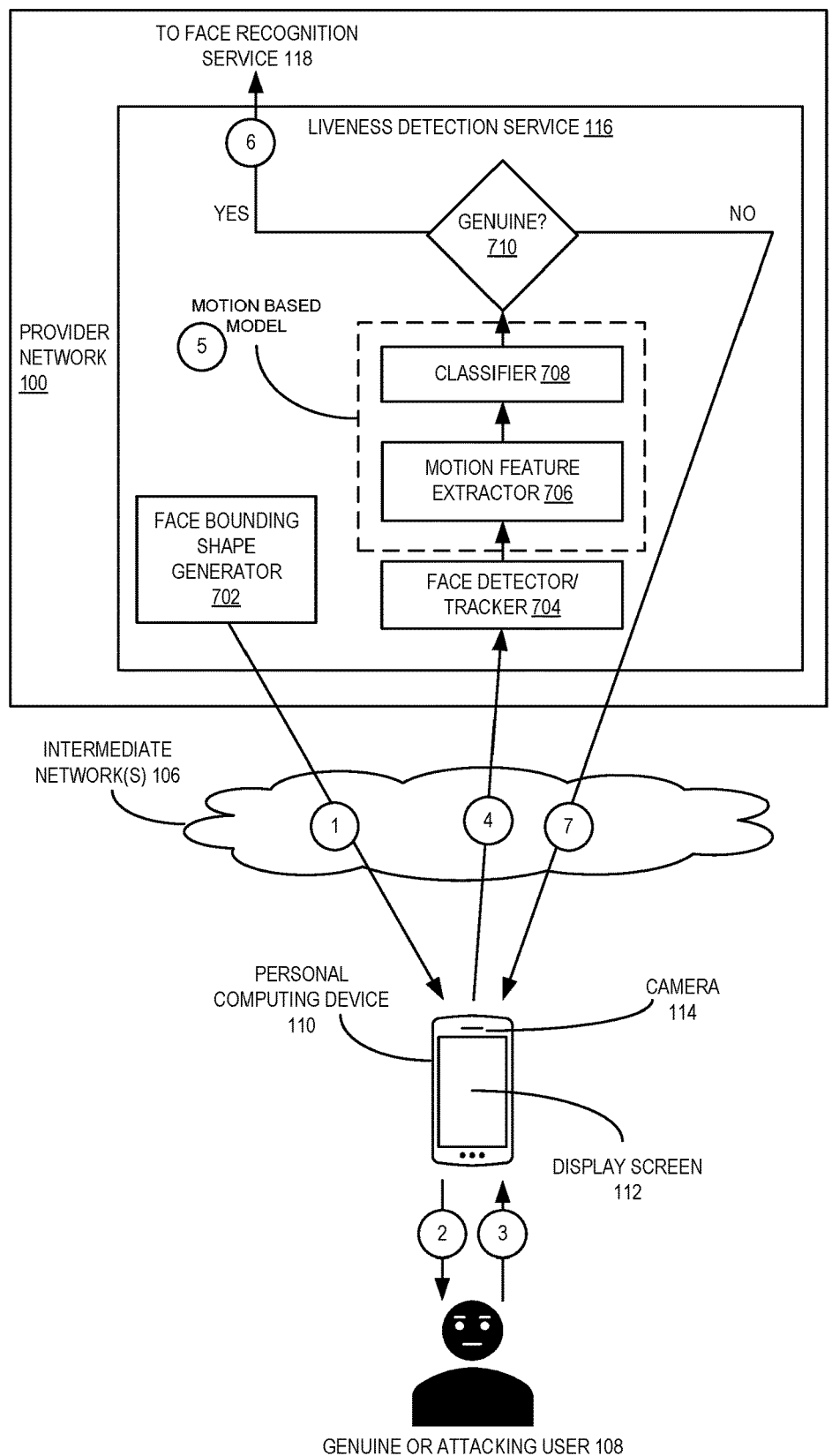
FIG. 7 depicts the face authentication computer system of FIG. 1 in which the liveness detection service can be programmed or configured to perform liveness detection using a motion-based model, according to some examples.

FIG. 7 depicts the face-based authentication computer system of FIG. 1 and in which liveness detection service 116 is programmed or configured to perform liveness detection using a motion-based model, according to some examples. Using a motion-based model for liveness detection is described below in the context of the high-level face authentication process described above with respect to FIG. 1. Like FIG. 1, steps of the face authentication process that uses a motion-based model for liveness detection are depicted in FIG. 7 as numbered circles and directional arrows represent a direction of data flow between connected components but not necessarily the exclusive direction. Data represented by directed arrows in FIG. 7 that flows between depicted components can traverse one or more intermediate components (e.g., an intermediate network or computing device). Such an intermediate component may not be depicted in FIG. 7 for the purpose of providing a clear example.

In some examples, liveness detection can be performed by liveness detection service 116 based on face or head movements. At Step 1, face bounding shape generator 702 is programmed or configured to generate a face bounding shape pattern to display on screen 112. The face bounding box pattern can include a sequence of one or more face bounding shapes to display on screen 112. In some examples, the face bounding shape is an oval but can be other shape such as a circle, square, or rectangle. The bounding shape used can vary depending on the dimensions of screen 112. For example, where screen 112 is rectangular such as is common with consumer smartphones, the bounding shape can be an oval or a rectangle with the longer axis of the oval or rectangle parallel with the longer axis of screen 112. However, any of an oval, rectangle, square, or circle can be used.

At Step 2, as a challenge, user 108 is requested to position their face such that it fits just inside the displayed face bounding shape. A series of face bounding shapes can be displayed one after the other and of different dimensions to cause user 108 at Step 3 to move their face toward or away from camera 114 or cause user 108 to move device 110 or camera 114 closer to or farther away from their face to fit their face just within the face bounding shape currently displayed on screen 112. By doing so, motion can be captured in a set of target images sent from front end 102 to back end 104 at Step 4. The motion in the set of target images can be analyzed by liveness detection service 116 at Step 5 according to a motion-based model to determine the liveness of user 108. The set of target images or data derived therefrom can be forwarded to face recognition service 118 at Step 6 if it is determined that user 108 is genuine. If it is determined that user 108 is not genuine, then data indicating that the face authentication process failed can be returned to front end 102 at Step 7.

To verify the liveness of user 108 using the motion-based model, the set of target images captured by camera 114 can capture motion of the face of user 108. To induce the motion, face bounding shape generator 702 can generate a face bounding shape pattern to be displayed to user 108 on screen 112. The face bounding shape pattern can include a set of one or more face bounding shapes. Each face bounding shape can be displayed on screen 112 until user 108 has fit their face just within the face bounding shape or until a timer has elapsed (e.g., a ten, twenty, or thirty second timer). Meanwhile, target images captured by camera 114 can be streamed from front end 102 to back end 104 as user 108 is moving their face to fit within the face bounding shape thereby capturing motion in the set of target images. The motion of a detected/tracked face in the set of target images can be analyzed for liveness. If the timer expires before user 108 has fit their face within a currently displayed face bounding shape, then the face authentication process can be stopped.

Face detector/tracker 704 can be programmed or configured like face detector/tracker 204 of FIG. 2 to detect a face in a target image, to track a face in target images of the set of target images, or to identify face landmarks on a detected/tracked face in a target image. Like with liveness detection based on display screen light reflections, operations for face detection, face tracking, or face landmark identification can be performed for liveness detection based on a motion-based model at device 110 instead of by face detector/tracker 704 of liveness detection service 116. Thus, while FIG. 7 depicts face detector/tracker 704 as a component or module of liveness detection service 116, face detector/tracker 704 can instead be a component or module of device 110.

Based on the location of the facial landmarks in the target images, face detector/tracker 704 can be programmed or configured to determine when user 108 has fit their face within the dimensions of the currently displayed face bounding shape. For example, face detector/tracker 704 at device 110 or at liveness detection service 116 can be programmed or configured to use one or more machine learning models to estimate a face pose of a detected/tracked face in a set of target images and detect when the detected/tracked face is fit within the current displayed face bounding shape. Face detector/tracker 704 can be programmed or configured to signal face bounding shape generator 702 or device 110 to trigger display of a next face bounding shape screen 112 (if there is one) after user 108 has successfully fit their face within the currently displayed face bounding shape.

In some examples, only a single face bounding shape is displayed during a face bounding shape challenge. The size of the face bounding shape can be selected based on assuming that the face of user 108 at the start of the face bounding shape challenge is at a normal comfortable viewing distance from screen 112 such as between forty and eighty centimeters (~sixteen to thirty-two inches) and assuming camera 114 is positioned at the same or approximately the same distance from the face of user 108 as screen 112. This is typically the case when camera 114 is a smartphone camera or a laptop camera or a camera integrated with or fastened to a desktop monitor. At the normal distance it can be easier for user 108 to move their face toward screen 112 and camera 114 than it can be for user 108 to move their face away from screen 112 and camera 114. For example, if user 108 is sitting in a chair using a laptop or desktop computer, then user 108 can lean forward to bring their face closer to screen 112 and camera 114. If user 108 is using a handheld computing device such as a smartphone, then user 108 can bring screen 112 and camera 114 of the handheld device closer to their face with a flexion of the elbow. Accordingly, the dimensions of the face bounding shape can be selected so that user 108 is induced to bring their face closer to screen 112 and camera 114 relative to the normal distance. At the same time, the dimensions of the face bounding shape can be selected so that the user 108 is not required to bring their face uncomfortably close to screen 112.

Figure 8:
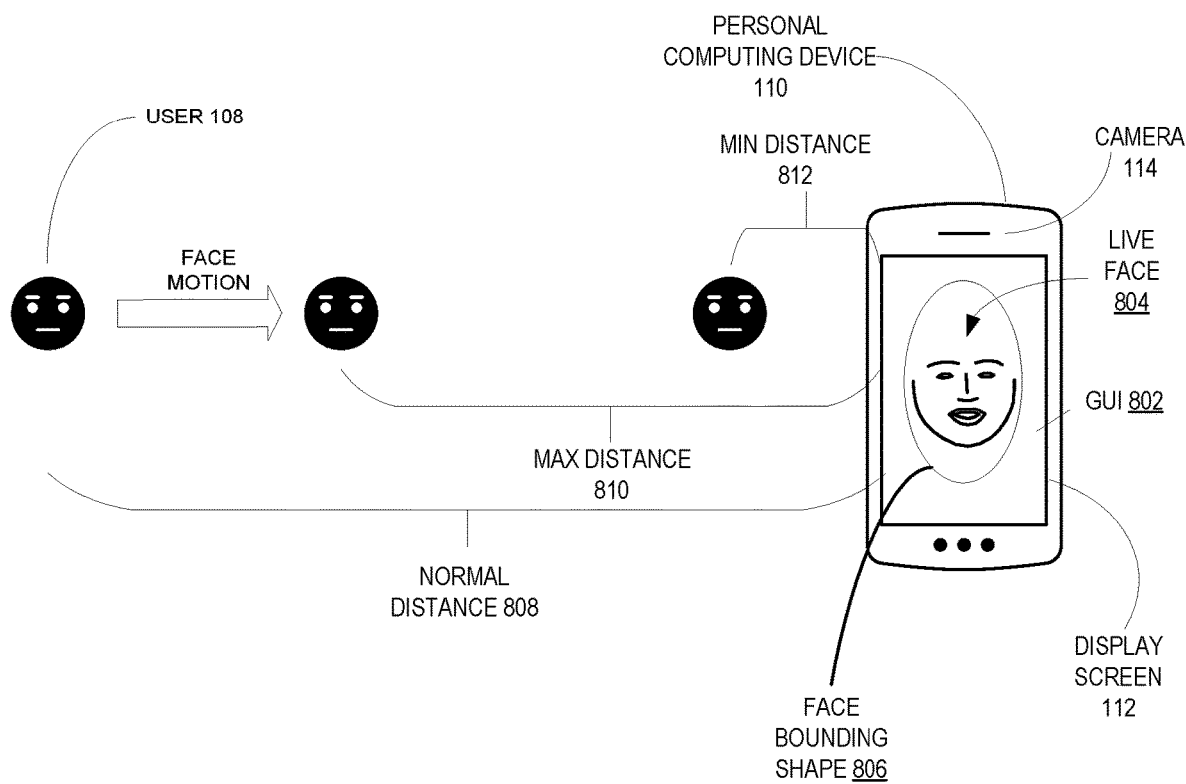
FIG. 8 illustrates an example of using a face bounding shape challenge to induce face motion, according to some examples.

FIG. 8 illustrates sizing a face bounding shape according to some examples. User 108 uses personal computing device 110 with screen 112 and camera 114. GUI 802 is presented on screen 112 and displays live face 804 of user 108 in real time as captured by camera 114. The face of user 108 is assumed to initially be at normal distance 808 from screen 112 and camera 114. Face bounding shape 806 is sized in GUI 802 such that user 108 is induced to move their face from normal distance 808 to between maximum distance 810 and minimum distance 812 from screen 112 and camera 114. In some examples, as user 108 moves their face from normal distance 808 to between maximum distance 810 and minimum distance 812, a set of target images are captured by camera 114. This set of target images captures motion of the face of user 108 that can be analyzed for liveness using a motion-based model as described herein. In some examples, once user 108 has fit their face within face bounding shape 806, a color light pattern challenge is displayed on screen 112 and an additional set of target images is captured by camera 114 that can be analyzed for liveness using a face light reflection model as described herein. Thus, the sizing of a face bounding shape can achieve both (1) the objective of causing user 108 to move their face and thereby provide motion that can be captured by camera 114 in a set of target images for motion-based model liveness analysis and (2) the objective of having the face of user 108 comfortably close enough to screen 112 and camera 114 so that light emitted from screen 112 during presentation of a color light pattern challenge on screen 112 is adequately reflected off the face of user 108 accounting for different human skin colors and different environment lighting conditions.

In some examples, face detector/tracker 704 at device 110 can be programmed or configured to estimate an initial distance of the face of user 108 from screen 112 and camera 114 even if camera 114 is not a stereo camera and is not configured with a hardware depth sensor. In particular, face detector/tracker 704 can be programed or configured to analyze a set of pre-challenge target images and estimate an initial distance of a detected/tracked face in the set of pre-challenge target images. For example, the analysis can be based on a triangular similarity algorithm or other suitable algorithm that can be used to estimate a distance of an object from camera 114 as captured in an image by camera 114 without requiring camera 114 to be a stereo camera and without requiring a depth sensor (e.g., an infrared sensor). As an example of an alternative suitable algorithm, the initial distance can be estimated by detecting or tracking a face in a target image and then determining the area of the target image covered by the detected or tracked face. The larger the area covered, the closer the distance to camera 114. The smaller the area covered, the father away the distance to camera 114. The initial distance can be estimated based on how much of the area of the target image is occupied by the detected/tracked face.

If the estimated initial distance is greater than maximum distance 810, then a single face bounding shape can be used as described above that is sized to induce user 108 to move their face toward screen 112 and camera 114 so that the distance of the face of user 108 from screen 112 and camera 114 is between maximum distance 810 and minimum distance 812. However, if the initial distance is between maximum distance 810 and minimum distance 812, then two face bounding shapes of different sizes can be used. A first face bounding shape can be used to cause user 108 to move their face away from screen 112 and camera 114 so that the distance of the face of user 108 (e.g., as measured according to a triangular similarity algorithm or other suitable algorithm) is greater than maximum distance 810. Once the face of user 108 is at a distance greater than maximum distance 810, then a second face bounding shape can be displayed on screen 112 that is designed to induce user 108 to move their face closer to screen 112 and camera 114 like in the single face bounding shape scenario described above. In any case, a set of target images can be captured by camera 114 as user 108 moves their face toward screen 112 and camera 114 starting from distance from screen 112 and camera 114 that is greater than maximum distance 810. As indicated, once user 108 has positioned their face at a distance between maximum distance 810 and minimum distance 812, an instruction can be displayed on screen 112 requesting user 108 to hold still (e.g., stop moving toward screen 112 and camera 114). Once at this hold distance, a color light pattern challenge can be presented on screen 112.

Figure 9:
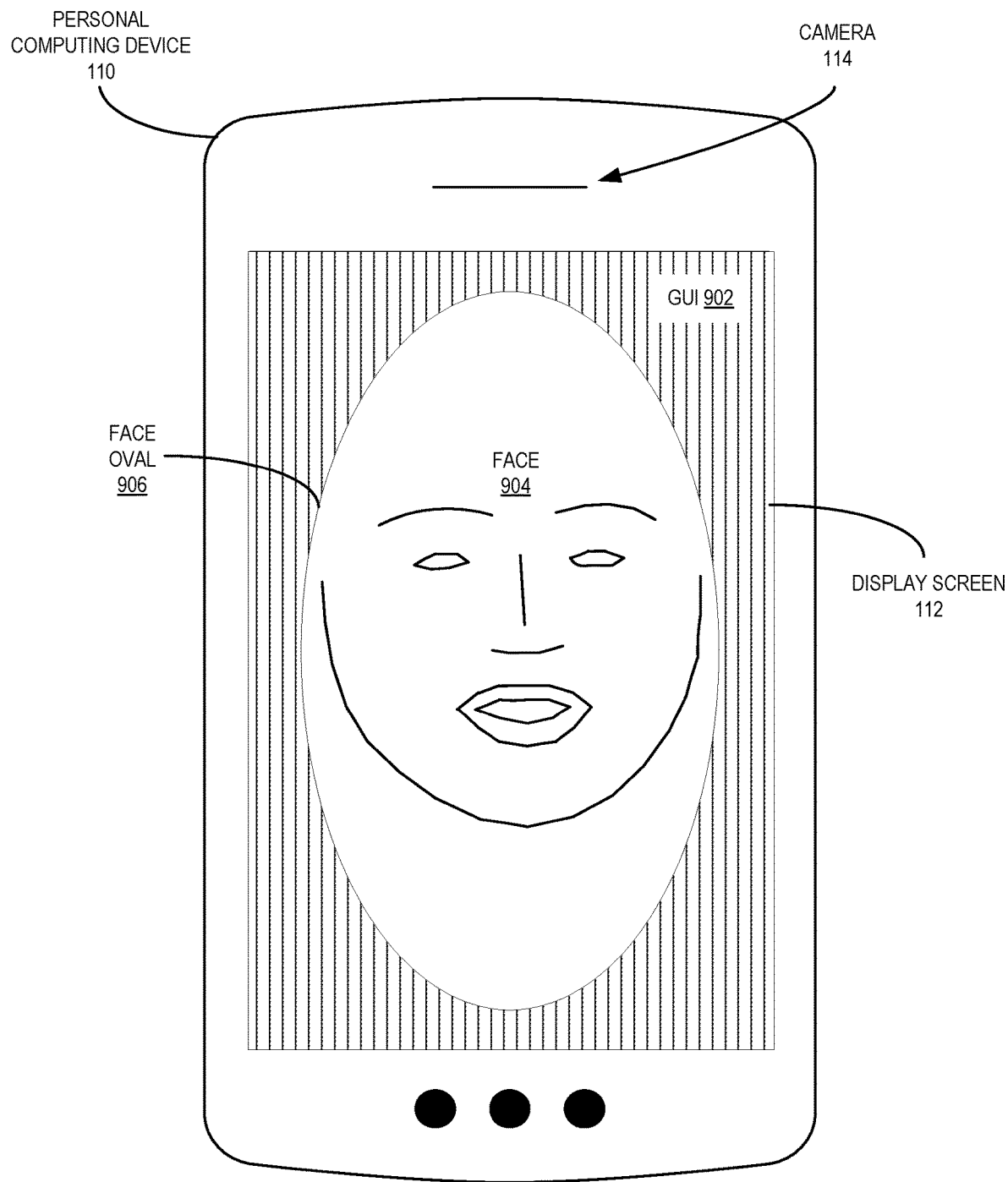
FIG. 9, FIG. 10, and FIG. 11 depict a sequence of face oval challenges, according to some examples.

As indicated, the face bounding shapes in a series of face bounding shapes displayed on screen 112 can have different sizes on screen 112 to induce motion of the face by user 108 relative to screen 112 and camera 114. FIG. 9 illustrates first face oval 906 in a series. Face oval 906 can be displayed as part of GUI 902 on display screen 112 of device 110. Face 904 of user 108 as captured by camera 114 can also be displayed on screen 112 to guide user 108. User 108 can be prompted (not shown) in GUI 902 to move their face 904 closer to camera 114 or farther away from camera 114 until their face 904 fits tightly in face oval 906. As user 108 is responding to the face oval challenge, target images can be streamed from device 110 to liveness detection service 116. Face detector/tracker 704 can analyze the streamed target images to determine when user 108 has positioned their face 904 tightly within face oval 906. For example, face detector/tracker 704 can employ face pose estimation techniques possibly involving the use of one or more trained machine learning models, a triangular similarity algorithm, or other suitable algorithm to determine when user 108 has positioned their face 904 tightly within face oval 906 (e.g., when face 904 is at a distance from screen 112 and camera 114 where face 904 would fit tightly within face oval 906). As mentioned, target images captured by camera 114 can be streamed to liveness detection service 116 for analysis by face detector/tracker 704 there. Alternatively, target images can be analyzed by face detector/tracker 704 at device 110 and the results of the analysis sent to liveness detection service as needed.

Figure 10:
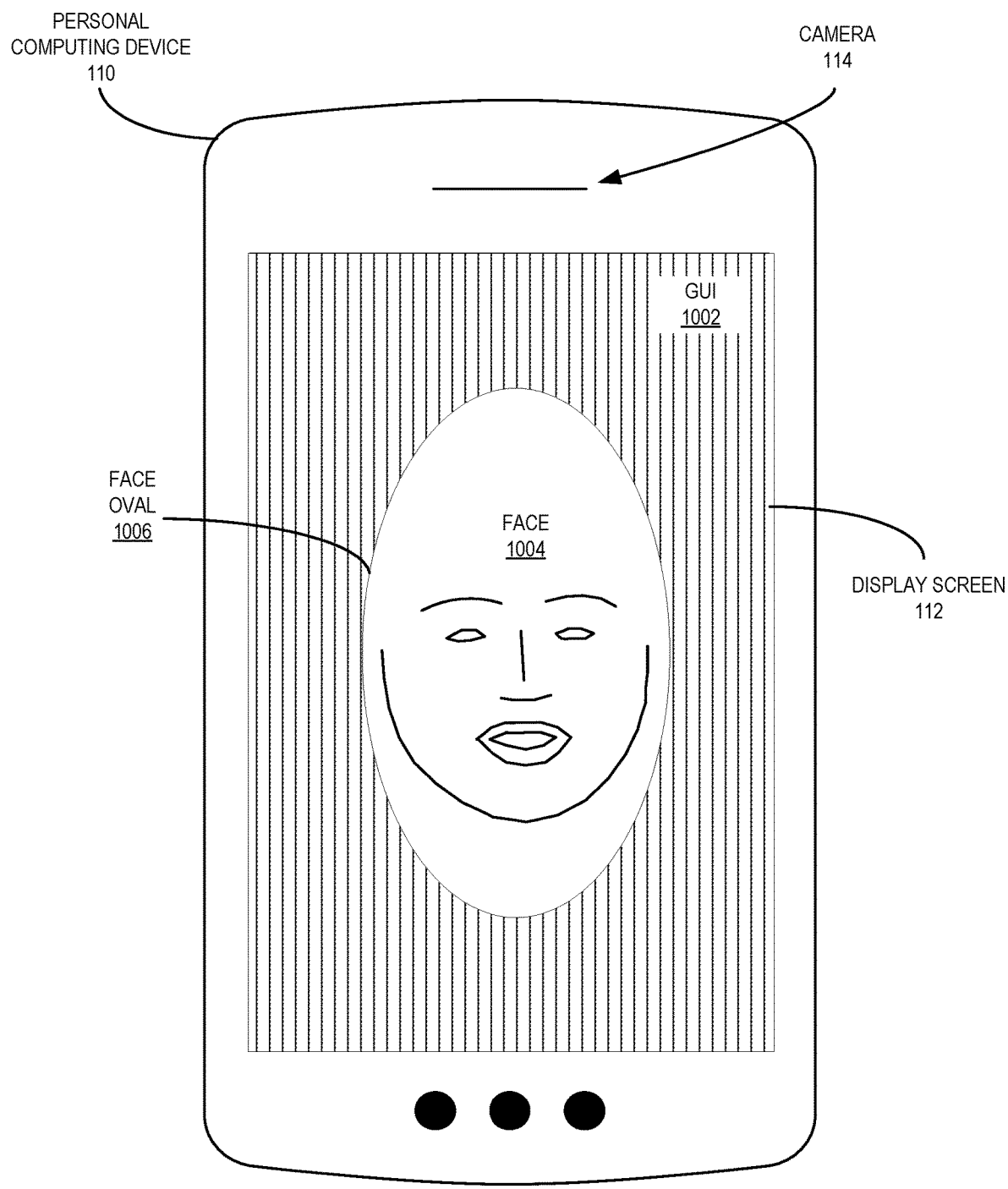

FIG. 10 illustrates second face oval 1006 in the series that can be displayed on screen 112 after user 108 has successfully fit their face 904 tightly in first face oval 906. Second face oval 1006 has a smaller interior area on screen 112 than first face oval 906. As a result, user 108 can move their face farther away from camera 114 relative to the position of face 904 when it tightly fit in first face oval 906 such as, for example, by extending their arm while holding device 110 and facing screen 112 and camera 114. The target images captured by camera 114 that capture the motion of the face away from screen 112 and camera 114 as the face is moved from fitting tightly within first face oval 906 to fitting tightly within second face oval 1006 can be sent to liveness detection service 116 from front end 102 to back end 104 for liveness analysis there or analyzed at device 110.

Figure 11:
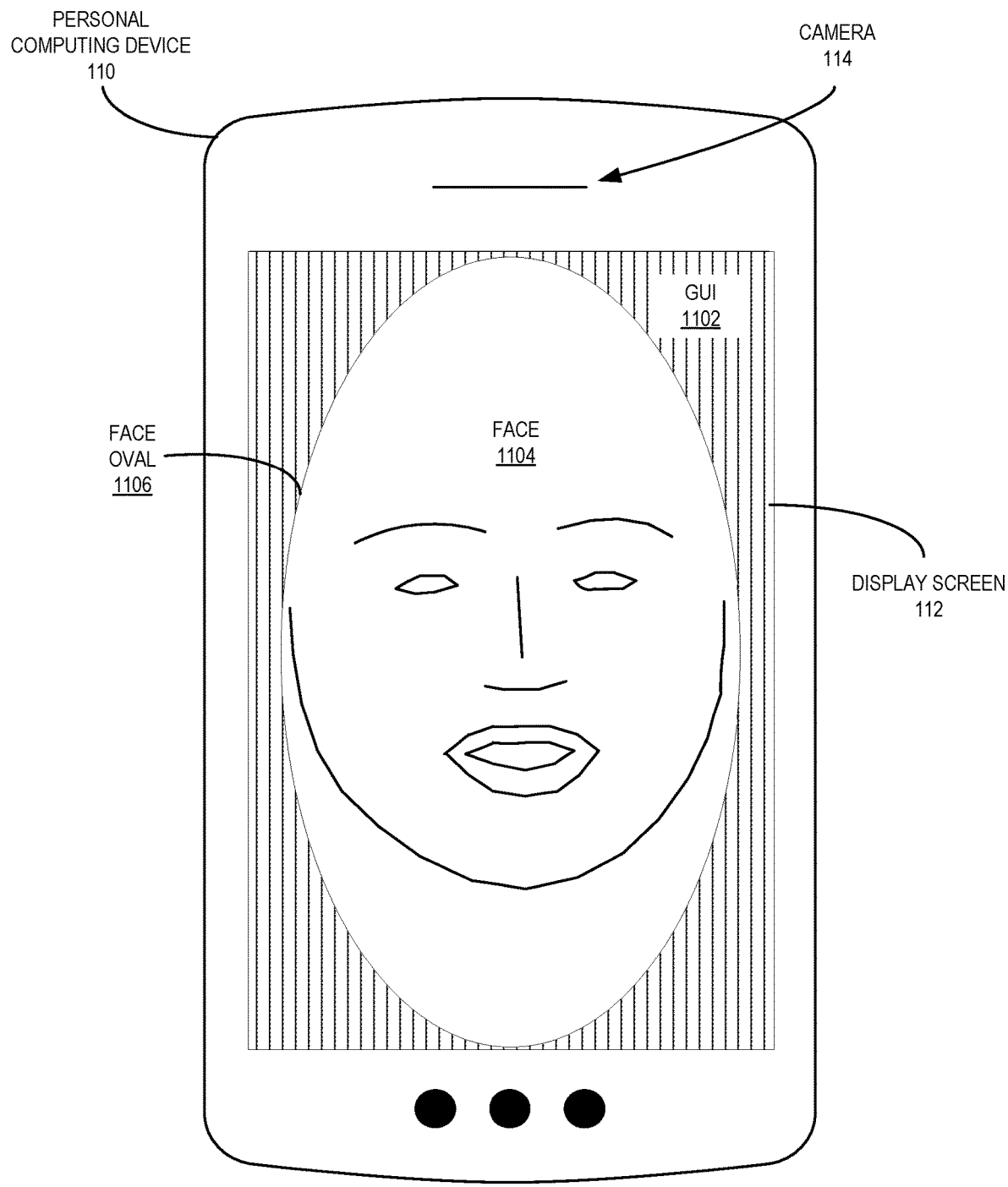

FIG. 11 illustrates third face oval 1106 in the series that can be displayed on screen 112 after user 108 has successfully fit their face 1004 tightly in second face oval 1006. Third face oval 1106 has a larger interior area on screen 112 than second face oval 1006. As a result, user 108 can move their face 1104 closer to screen 112 and camera 114 relative to the position of face 1004 when it tightly fit in second face oval 1006 such as, for example, by bringing device 110 closer to the face while holding device 110 and facing screen 112 and camera 114. The target images captured by camera 114 that capture the motion of the face toward screen 112 and camera 114 as the face 1104 is moved from fitting tightly within second face oval 1006 to fitting tightly within third face oval 1106 can be sent to liveness detection service 116 from front end 102 for liveness analysis or analyzed at device 110.

In some examples, the size of the first bounding shape in a sequence of face bounding shape is selected based on an initial position of the face of user 108. For example, before the start of a face bounding shape challenge, pre-challenge target images captured by camera 114 can be streamed to liveness detection service 116 or analyzed at device 110. Face detector/tracker 704 can analyze these pre-challenge target images to determine if a detected/tracked face is being held in a steady position and to determine how much of the image area is occupied by the detected/tracked face. The closer the face of user 108 is to camera 114, the more image area the face of user 108 will occupy. The farther away the face of user 108 is from camera 114, the less image area the face of user 108 will occupy. Pre-challenge instructions can instruct user 108 to hold their face from camera 114 in a steady position at a comfortable distance from camera 114. The pre-challenge target images captured by camera 114 of user 108 following these instructions can be streamed to liveness detection service 116 for analysis. Liveness detection service 116 or device 110 can analyze these pre-challenge target images and determine when user 108 has settled into a steady position. Then liveness detection service 116 or device 110 can select a size of the first face bounding shape of the face bounding shape challenge. The size of the first face bounding shape can be such that user 108 is required to move from their face closer to or farther away from screen 112 and camera 114 from the initial steady distance to fit their face tightly within the boundary of the first face bounding shape. For example, if the initial steady position of the face of user 108 is close to camera 114, then the first face bounding shape may be smaller than a face bounding shape that would tightly fit the face of user 108 in the initial steady position. By doing so, user 108 can be induced to move their face away from screen 112 and camera 114. On the other hand, if the initial steady position of the face of user 108 is away from camera 114, then the first face bounding shape may be larger than a face bounding shape that would tightly fit the face of user 108 in the initial steady position. By doing so, user 108 can be induced to move their face closer to camera 114. Camera 114 can capture the movement of the face of user 108 as user 108 moves their face toward or away from camera 114. These target images can be sent to liveness detection service 116 for liveness analysis.

In some examples, the pre-challenge target images are not sent from device 110 to liveness detection service 116. Instead, to avoid delay of intermediate network(s) 106, device 110 is programmed or configured with a face detection/tracking module for determining when user 108 has positioned their face in an initial steady position. In this case, the face bounding shape challenge can be generated at device 110. Stated otherwise, to avoid pre-challenge delay of round-trip communications over intermediate network(s) 106 between device 110 and liveness detection service 116, functionality of face detector/tracker 704 and face bounding shape generator 702 including any machine learning models used can be located and performed at device 110. Device 110 can be programmed or configured to perform the functionality described above including determining when user 108 has positioned their face in an initial steady position and generating and displaying of a set of one or more face bounding shapes on screen 112 designed to induce movement by user 108 of their face toward or away from screen 112 camera 114. The target images captured by screen 112 and camera 114 of user 108 responding to the face bounding shape challenge can be streamed to liveness detection service 116 for liveness analysis by the motion-based model.

In some examples, at least two face bounding shapes are presented in a face bounding shape challenge. The first is opposite the initial position of user 108 and the second is opposite the first. For example, if the initial steady position of the face of user 108 is relatively close to screen 112 and camera 114, then the first face bounding shape can be sized such that user 108 is induced to move their face away from camera 114 and the second face bounding shape can be sized such that user 108 is induced to move their face closer to camera 114. If the initial steady position of the face of user 108 is relatively far from camera 114, then the first face bounding shape can be sized such that user 108 is induced to move their face closer to camera 114 and the second face bounding shape can be sized such that user 108 is induced to move their face away from camera 114.

While in some examples a face bounding shape challenge is designed to induce motion of face of user 108 toward and away from camera 114, the challenge can be designed to induce other motion. For example, the challenge can prompt user 108 to rotate their head to the left (or right), then to the right (or left) and once again back to the left (or right). In any case, a goal of the challenge can be to induce motion of the face of user 108 that is sufficient to provide enough motion information for a proper liveness analysis by liveness detection service 116.

A motion-based model can encompass feature extractor 706 and classifier 708. Feature extractor 706 can be programmed or configured to extract a set of motion features representing motion of a detected/tracked face in a set of target images. The set of motion features can be extracted using a deep machine learning algorithm, an optical flow algorithm, a frame differences algorithm, a combination of these algorithms, or other algorithm suitable for representing the motion of a detected/tracked face across a set of target images. Classifier 708 can encompass a pre-trained machine learning classifier trained to classify the set of motion features as to liveness. The pre-trained classifier can output a liveness score that represents numerically a confidence or probability that the motion of the detected/tracked face represented by the set of extracted features is motion by a genuine user. Decision module 710 can make a liveness determination based on the liveness score output by the classifier 708. For example, decision module 710 can determine that user 108 is genuine if liveness scores is above a threshold score.

Motion feature extractor 706 can be programmed or configured to extract motion features from the set of target images that are responsive to the face bounding shape challenge. The extracted motion features can be input to trained machine learning classifier 708. In some examples, classifier 708 can encompass a pre-trained deep Convolutional Neural Network (CNN). The pre-trained deep CNN can be used to generate features from a detected/tracked face in the target images. A pre-trained Long-Short-Term Memory Recurrent Neural Network (LSTM-RNN) can be used in classifier 708 to predict whether the face motion in the set of target images is genuine or not from sequences of features generated by the pre-trained deep CNN.

In some examples, motion feature extractor 706 can convert a sequence of target images into a sequence of features vectors. A feature vector can be generated from a target image by motion feature extractor 706 by using a pre-trained deep CNN of classifier 708. The sequence of feature vectors generated by the pre-trained deep CNN can be input to a pre-trained LSTM-RNN of classifier 708. For example, the LSTM-RNN can be composed of four layers including a layer of LSTM cells, a layer of dense cells, a drop out layer, and a softmax layer. The output of the pre-trained LSTM-RNN can be from the softmax layer of the LSTM-RNN that classifies the motion of the face in the set of target images as represented by the sequence of feature vectors generated by the pre-trained deep CNN. For example, the pre-trained LSTM-RNN can be trained as a binary classifier to classify the face motion is either genuine or not genuine (impersonated). Alternatively, the pre-trained LSTM-RNN can be trained (e.g., jointly trained with the pre-trained deep CNN) as a multi-class classifier to classify the face motion as genuine or by the type of attack. For example, a set of possible classes could include: genuine, injection, or deepfake. While a pre-trained LSTM-RNN can be used, another type of sequence classification model can be used such as, for example, another type of Recurrent Neural Network (RNN) (e.g., a Gated Recurrent Unit RNN (GRU-RNN), an auto-encoder, or a transformer.

As an alternative to using a deep CNN and LSTM, motion feature extractor 706 can be programmed or configured to extract a set of optical flow features from the set of target images. Classifier 708 can encompass one or more pre-trained machine learning models trained to classify the set of optical flow features as to liveness. An optical flow analysis performed by motion feature extractor 706 can involve representing motion of a detected/tracked face in a sequence of target images in a form of a vector field. The vector field can allow for the transformation of one facial image from the sequence of target images into the next facial image in the sequence by moving pixels of the first image in the direction indicated by the corresponding components of the vector field. Various techniques can be used by motion feature extractor 706 to compute an optical flow vector field from a sequence of target images with a goal of the optical flow analysis being to compute a sequence of velocity vectors for pixels on a detected/tracked face in the sequence of target images. The sequence of velocity vectors can encompass information about the speed and direction in which the pixels on the detected/tracked face are moving over the sequence of target images. The sequence of optical flow-based velocity vectors generated by motion feature extractor 706 can be input to a pre-trained LSTM of classifier 708. The output of the LSTM can be from a softmax layer of the LSTM-RNN that classifies the motion of the face in the sequence of target images as represented by the sequence of optical flow-based velocity vectors computed by motion feature extractor 706. For example, the LSTM-RNN can be trained as a binary classifier to classify the face motion is either genuine or not genuine (impersonated). Alternatively, the LSTM-RNN can be trained as a multi-class classifier to classify the face motion as genuine or by the type of attack. For example, a set of possible classes could include: genuine, injection, or deepfake. While a pre-trained LSTM-RNN can be used, another type of sequence classification model can be used such as, for example, another type of Recurrent Neural Network (RNN) (e.g., a Gated Recurrent Unit RNN (GRU-RNN), an auto-encoder, or a transformer.

In some examples, motion feature extractor can be programmed or configured to extract a set of image differences features. Classifier 708 can encompass one or more pre-trained machine learning models trained to classify the set of image differences features as to liveness. An image differences analysis performed by motion feature extractor 706 on a sequence of target images can involve representing motion of a detected/tracked face in the sequence of target images by comparing pixel values of target images and binarizing the pixels on the detected/tracked face as to motion based on the comparisons. The result is a sequence of binarized images where pixel values of a binarized images represent motion. For example, a binarized image can be two-color image where one pixel color represents area of motion in the image and the other pixel color represents lack of motion. The sequence of binarized images can be input to a pre-trained machine learning classier 708. The output of the pre-trained classifier 708 can be a binary classification (e.g., genuine or not genuine). Pre-trained classifier 708 can also be trained as a multi-class classifier. For example, a set of possible classes into which a sequence of binarized images could be classified could include: genuine, injection, deepfake, or uncertain.

Classifier 708 can encompass a trained machine learning classifier. For example, the trained machine learning classifier can be trained with sequences of data representing motion of real faces (genuine faces) and the motion of impersonated faces. In some examples, the machine learning classifier is trained based on a third kind of data referred to herein as "uncertain" motion. By doing so, the probability of falsely classifying an attack as genuine can be reduced.

Classifier 708 can be programmed or configured to determine whether the information characterizing the motion of a face in a set of target images received from front end 102 describes a genuine face or an impersonated face. Motion feature extractor 706 can be programmed or configured to encode the motion in the set of target images as a set or sequence of vectors. Classifier 708 can use a trained machine learning classifier to assign a class label to a vector or a set or sequence of vectors when provided as input. The possible class labels can be, for example, "genuine," "fake," and "uncertain," for example.

To train the classifier, a set of training examples in the form of a set vectors representing genuine motion, fake motion, and uncertain motion can be collected and labeled. The classifier can then be trained in a supervised learning manner based on the set of training examples. In some examples, the multiclass classifier is based on a Support Vector Machine (SVM). With a SVM, each observation in the training set can be treated as a point in N-dimensional space and the SVM can determine a hyperplane separating examples in the training set belonging to the different classes (e.g., "genuine," "fake," and "uncertain"). The SVM can use as a polynomial kernel, a Gaussian radial basis function kernel, or other non-linear kernel to handle the three classes. However, where the "uncertain" class is not used, a linear kernel can be used and classifier 708 can be a binary classifier. Further, use of a SVM is not required and other types of binary or multiclass classifiers can be used. For example, a logistic regression, Naïve Bayes, Nearest Neighbor, Decision Tree, Boosted Tree, Random Forest, or neural network classifier can be used.

Classifier 708 can be programmed or configured to assign a label to each image in a set of target images received from device 110. In the case classifier 708 is trained as a binary classifier, the label can be "genuine" or "fake," or the like. In the case classifier 708 is trained as a multiclass classifier, the label can be "genuine," "fake," or "uncertain," or the like.

With the classification decisions for a set of target images, decision module 710 can determine whether the face moving in the set of target images is genuine or not. In some examples, this decision is based on set of factors including the total number of target images that are classified by classifier 708 and the number of those target images that are classified as "genuine" and the number of those target images classified as "fake." For example, if the number of target images classified as "genuine" is more than a threshold percentage (e.g., more than 50%) of the sum of the number of "genuine" images and the number of "fake" images, then decision module 710 can determine that user 108 is genuine.

On the other hand, decision module 710 can use the output of classifier 708 directly. For example, if classifier 708 determines that user 108 is genuine, then decision module 710 can determine that user 108 is genuine. Otherwise, decision module 710 can determine that user 108 is not genuine.

Liveness Detection Using Face-Based Model

Figure 12:
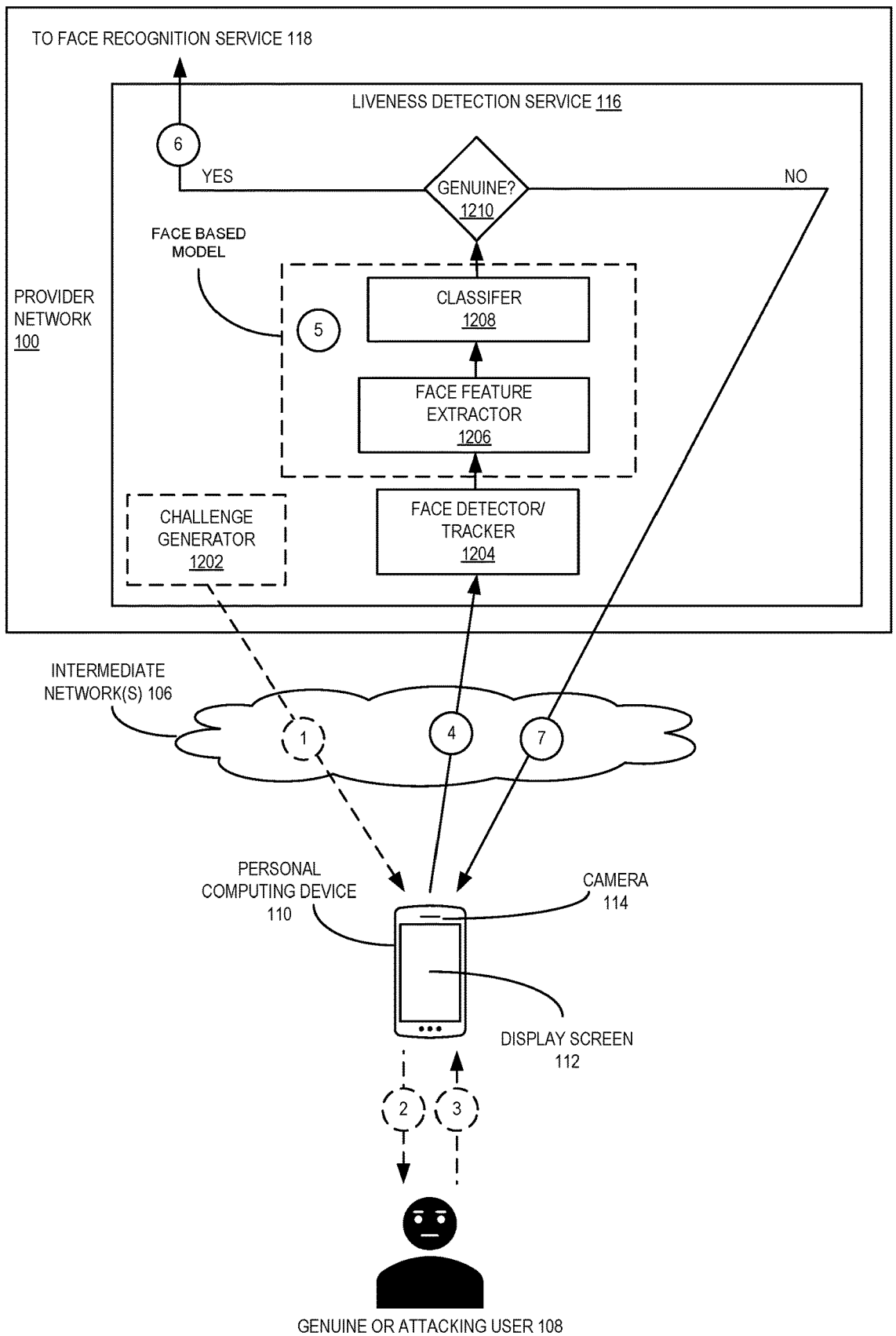
FIG. 12 depicts the face authentication computer system of FIG. 1 in which the liveness detection service can be programmed or configured to perform liveness detection using a face-based model, according to some examples.

In some examples, a face-based model is used to determine the liveness of user 108. FIG. 12 depicts the face-based authentication computer system of FIG. 1 in which the liveness detection service can be programmed or configured to perform liveness detection using a face-based model, according to some examples.

Using a face-based model for liveness detection is described below in the context of the high-level face authentication process described above with respect to FIG. 1. Like FIG. 1, steps of the face authentication process that uses a face-based model for liveness detection are depicted in FIG. 12 as numbered circles and directional arrows represent a direction of data flow between connected components but not necessarily the exclusive direction. Data represented by directed arrows in FIG. 12 that flows between depicted components can traverse one or more intermediate components (e.g., an intermediate network or computing device). Such an intermediate component may not be depicted in FIG. 12 for the purpose of providing a clear example.

Using a face-based model for liveness detection can be performed by liveness detection service 116 in conjunction with a challenge-based liveness detection approach such as the display screen light reflection or the motion-based approaches described herein. However, use of a challenge-based approach is not required to be used with the face-based model approach. In the case that the face-based approach is not used in conjunction with a challenge-based approach, the face-based authentication process may start with step 4 where a set of target images are streamed from device 110 to liveness detection service 116. The set of target images can be of user 108 as captured by camera 114. Or the set of target images might be injected or synthetically generated target images in the case of an attack.

A face-based model can encompass face feature extractor 1206 and classifier 1208. Face feature extractor 1206 can be programmed or configured to extract a set of face features from the region of a set of one or more target images in which a detected/tracked face appears. The set of face features can be deep learning features (e.g., extracted using a convolutional neural network (CNN)), image texture features, image quality features, a combination of these features, or other suitable features. Classifier 1208 can encompass a pre-trained machine learning classifier trained to classify the set of face features as to liveness. The pre-trained classifier can output a liveness score that represents numerically a confidence or probability that the detected/tracked face represented by the set of extracted face features is a genuine face. Decision module 1210 can make a liveness determination based on the liveness score output by the classifier 1208. For example, decision module 1210 can determine that user 108 is genuine if liveness score is above a threshold score.

Face detector/tracker 1204 can be programmed or configured to receive the set of target images at Step 4. Face detector/tracker 1204 can be programmed or configured to detect or track in the set of target images. The portion containing a detected/tracked face can be cropped from the background of a target image by face detector/tracker 1204. Face detector 1204 can be programmed or configured to use a machine learning-based face object detection or tracking algorithm to detect or tracks faces in the set of target images.

Face detector/tracker 1204 can be programmed or configured to process the face images cropped from the set of target images to optimize them for face analysis. For example, face images can be further cropped to reduce the influence of the background on the analysis. The cropped face images or the further cropped face images can be downscaled to decrease noise in the face images and speed up the analysis. As indicated above, some or all the face detector/tracker 1204 can be implemented at device 110.

Face feature extraction module 1206 can be programmed or configured to extract features from the cropped facial images. Various different types of features can be extracted. In some examples, Moiré pattern features are extracted. Moiré patterns can be an undesired aliasing of images produced during various image display and image acquisition processes. Aliasing can encompass an effect in which reconstructed signals appear when two or more patterns are overlaid on top of each other, resulting in a third new pattern. Moiré patterns can appear when imaging (e.g., with camera 114) a color paper print according to a cyan, yellow, magenta, and black (CYMK) halftoning model, Moiré patterns can also appear when imaging (e.g., with camera 114) a display screen of a digital device such as a laptop screen, a mobile device screen, or tablet device screen. Thus, the presence of Moiré pattern in the set of target images streamed at Step 4 can be indicative of a presentation attack.

In some examples, image texture descriptors can be used to detect Moiré patterns in the set of video frames. The image texture descriptors can include deep learning features or Local Binary Pattern (LBP)-based visual descriptors such as Multi-scale Local Binary Pattern (MLBP) descriptors. In operation, face feature extraction module 1206 can be programmed or configured to divide a cropped face image into overlapping patches of pixels. MLBP descriptors can be extracted from the patches. The MLBP descriptors extracted from the patches can be concatenated together to construct a histogram and provide a feature vector for the face image.

Classifier 1208 can encompass a trained machine learning classifier. For example, the trained machine learning classifier can be trained with sequences of data representing images of genuine faces and images of presentation attacks containing Moiré pattern artifacts. Classifier 1208 can be programmed or configured to determine whether a feature vector generated by face feature extraction model 1206 for a face image cropped from a target image describes a genuine face or an impersonated face of a presentation attack with Moiré pattern artifacts. As mentioned, face feature extraction module 1206 can be programmed or configured to encode deep machine learning features, Local Binary Pattern (LBP) information or other texture features such as, for example, Difference of Gaussians (DoG) features or Histogram of Gradients (HoG) features, that are extracted from a cropped face image into a feature vector for the face image cropped from a video frame streamed from device 110 to liveness detection service 116. With this, classifier 1208 can use a trained machine learning classifier to assign a class label to the feature vector. The possible class labels can be "genuine" or "fake," for example.

While in some examples deep machine learning features (e.g., output by a trained CNN) or texture-based features such as LPB, DoG, or HoG features are used, image quality-based features can be used in addition to or instead of texture-based features. Image quality-based features can include specular reflection features, blurriness features, chromatic moment features, or color diversity features of the cropped face image. Specular reflection features can be used to distinguish between specular reflection from the skin of the face and a specular reflection from the presentation attack surface (e.g., a paper or LCD screen). Blurriness features can be used to distinguish an in-focus genuine face and out-of-focus presentation attack instrument that results from the attacking user having to place the presentation attack instrument extremely close to the lens of camera 114 to conceal the boundaries of the presentation attack instrument (e.g., the edge of the paper or the edge of the LCD screen). Chromatic moment features can be used to distinguish between genuine faces that have little or no color distortion when captured by camera 114 and the chromatic degradation that can occur in print and LCD screen reproductions captured by camera 114. Color diversity features can be used to distinguish between the richer colors of genuine faces and the fading color diversity in color reproductions of faces on paper or on an LCD screen that are captured by camera 114. These feature types can be represented as feature vectors. If multiple of these types of features are used, the feature vectors of the used types can be concatenated together to form a final feature vector used for training or inference.

To train the classifier, a set of training examples representing genuine face images and impersonated faces can be collected and labeled. The classifier can then be trained in a supervised learning manner based on the set of training examples. In some examples, the classifier is based on a Support Vector Machine (SVM), logistic regression, Naïve Bayes, Nearest Neighbor, Decision Tree, Boosted Tree, Random Forest, or neural network. Classifier 1208 can be programmed or configured to assign a label to each frame in the set of video frames received from front end 102. In the case classifier 1208 is trained as a binary classifier, the label can be "genuine" or "fake," or the like.

In some examples, classifier 1208 is programed or configured to use a deep machine learning classifier based on a jointly trained convolutional neural network (CNN) and Support Vector Machine (SMV). The CNN and SVM can be trained to distinguish between genuine and fake face images. Before training and inference, face feature extraction 1206 can process cropped face image such as by denoising or by aligning the face on the face image according to detected facial landmarks. This cropping, denoising, and aligning can also be done at inference time.

With the classification decisions for the set of target images, decision module 1210 can determine whether the face in the set of target images is genuine or not. In some examples, this decision is based on set of factors including the number of target images that are classified by classifier 1208 and the number of those images that are classified as "genuine" and the number classified as "fake." For example, if the number of images classified as "genuine" is more than a threshold percentage (e.g., more than 50%) of the sum of the number of "genuine" images and the number of "fake" images, then decision module 1210 can determine that user 108 is genuine. Otherwise, decision module 1210 can determine that user 108 is not genuine or an attacking user. In some examples, decision module 1210 can determine that user 108 is genuine only if all classified images are determined to be genuine. That is, if any classified image is determined not to contain a genuine face, then decision module 1210 can determine that user 108 is not genuine.

On the other hand, decision module 1210 can use the output of classifier 1208 directly. For example, if classifier 1208 determines that user 108 is genuine, then decision module 1210 can determine that user 108 is genuine. Otherwise, decision module 1210 can determine that user 108 is not genuine.

Liveness Detection Using Context-Based Model

Figure 13:
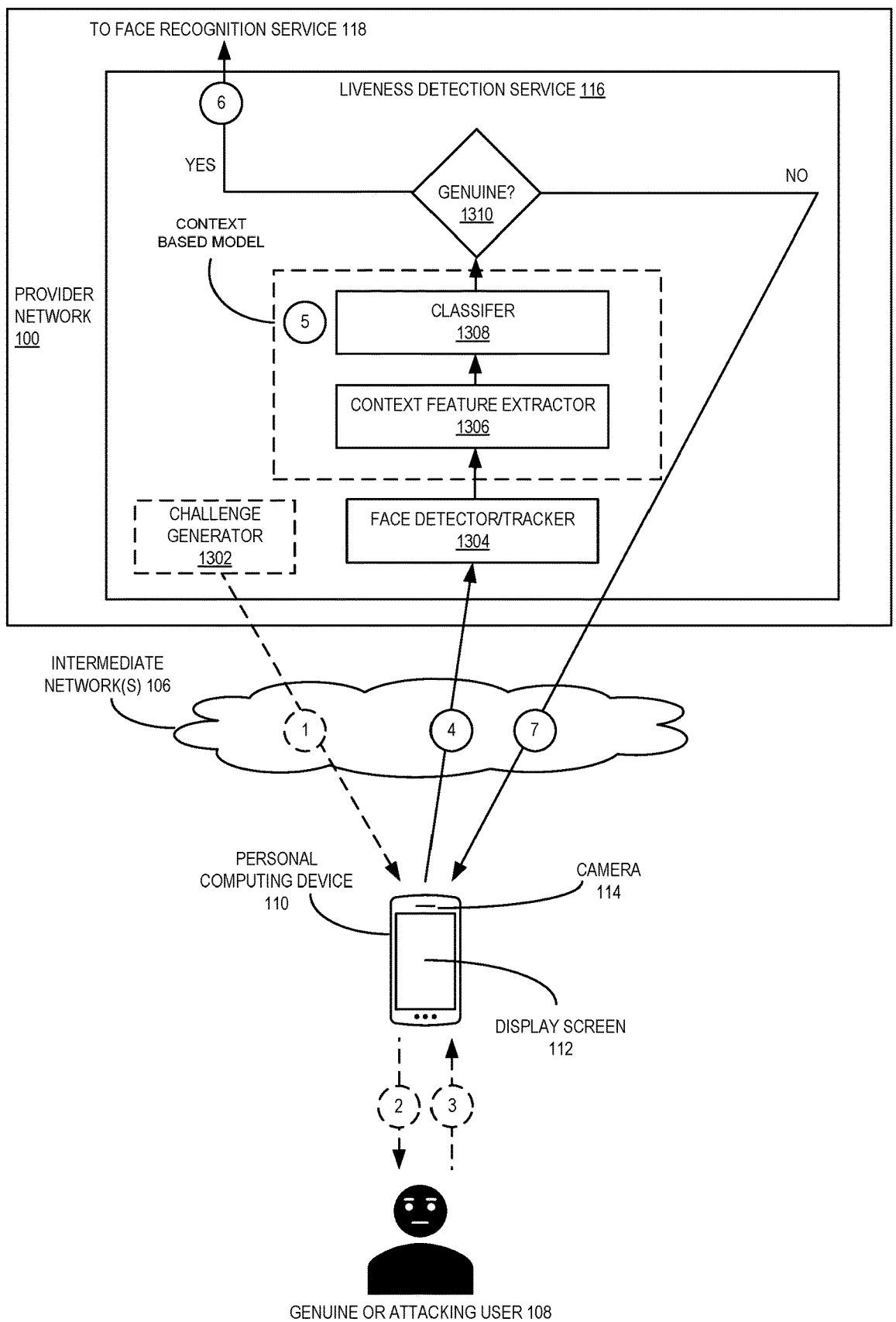
FIG. 13 depicts the face authentication computer system of FIG. 1 in which the liveness detection service can be programmed or configured to perform liveness detection using a context-based model, according to some examples.

In some examples, a context-based model is used to determine the liveness of user 108. FIG. 13 depicts the face authentication computer system of FIG. 1 in which the liveness detection service can be programmed or configured to perform liveness detection using a context-based model, according to some examples.

Using a context-based model for liveness detection is described below in the context of the high-level face authentication process described above with respect to FIG. 1. Like FIG. 1, steps of the face-based authentication process that uses a face-based model for liveness detection are depicted in FIG. 13 as numbered circles and directional arrows represent a direction of data flow between connected components but not necessarily the exclusive direction. Data represented by directed arrows in FIG. 13 that flows between depicted components can traverse one or more intermediate components (e.g., an intermediate network or computing device). Such an intermediate component may not be depicted in FIG. 13 for the purpose of providing a clear example.

Using a context-based model for liveness detection can be performed by liveness detection service 116 in conjunction with a challenge-based liveness detection approach such as the display screen light reflection or the motion-based approaches described herein. However, use of a challenge-based approach is not required to be used with the context-based model approach. In the case that the context-based approach is not used in conjunction with a challenge-based approach, the context-based authentication process may start with step 4 where a set of target images are streamed from device 110 to liveness detection service 116. The set of target images can be of user 108 as captured by camera 114. Or the set of video frames might be injected or synthetically generated target images in the case of an attack. The context-based model approach can also be used in conjunction with the face-based model approach, and with or without also using a challenge-based approach.

The context-based model approach can classify the entire target image as genuine or fake as opposed to just a face image region cropped therefrom. By doing so, the context-based model approach can identify attacks where the perimeter of the presentation attack medium is captured in the target image by camera 114. For example, the perimeter could be the edge of a printed paper or the edge of an LCD screen.

In some examples, classifier 1308 is a multiclass classifier. Labels of different attack types (e.g., printed paper, photograph, video replay on display screen, mask, etc.) can be used as the supervision to train the multiclass classifier. By doing so, discriminative features to distinguish between different types of presentation attacks can be learned, the embedding space of a liveness class can be squeezed into a more compact space than using a binary classifier which can help decrease the false positive rate, and fine-grained analysis can be conducted when the trained multiclass classifier misclassifies an example during inference.

Face detector/tracker 1304 can detect or track a face in a set of target images including facial landmark points like face detector/tracker 1204 and other face detector/tracker modules described herein. As indicated, some or all the functionality of face detector/tracker 1304 can be implemented at device 110.

A context-based model can encompass context feature extractor 1306 and classifier 1308. Context feature extractor 1306 can be programmed or configured to extract a set of context features from a set of one or more target images in which a detected/tracked face appears including from an area of a target image corresponding to a background in the target image. The background may include an area of the target image that does not encompass a detected/tracked face. The set of context features can be deep learning features (e.g., extracted using a convolutional neural network (CNN)), image texture features, image quality features, a combination of these features, or other suitable features. Classifier 1308 can encompass a pre-trained machine learning classifier trained to classify the set of context features as to liveness. The pre-trained classifier can output a liveness score that represents numerically a confidence or probability that the background represented by the set of context features is a genuine background. Decision module 1310 can make a liveness determination based on the liveness score output by the classifier 1308. For example, decision module 1310 can determine that user 108 is genuine if liveness score is above a threshold score.

Context feature extraction module 1306 can extract features like those that face feature extraction module 1206 of FIG. 12 extracts from cropped face images except that context feature extraction module 1306 can extract features from the entire video frame including the areas of the video frame outside the face. For training examples representing attacks, features can be extracted from the areas of video frames where a perimeter or edge of the present attack instrument appears.

Classifier 1308 can be programmed or configured to classify a target image. A target image may be classified as genuine or by its presentation attack type (e.g., paper, photograph, video replay on display screen, mask, etc.) In some examples, decision module 1310 determines that user 108 is genuine only if all or mor than threshold number of target images are classified as genuine.

In some examples, classifier 1308 includes a pre-trained deep CNN and SVM jointly trained to classify target images as to liveness. For example, the deep CNN and SVM can be trained to classify target images as genuine or by its presentation attack type (e.g., paper, photograph, video replay on display screen, mask, etc.).

HYBRID SYSTEMS FOR LIVENESS DETECTION

Figure 14:
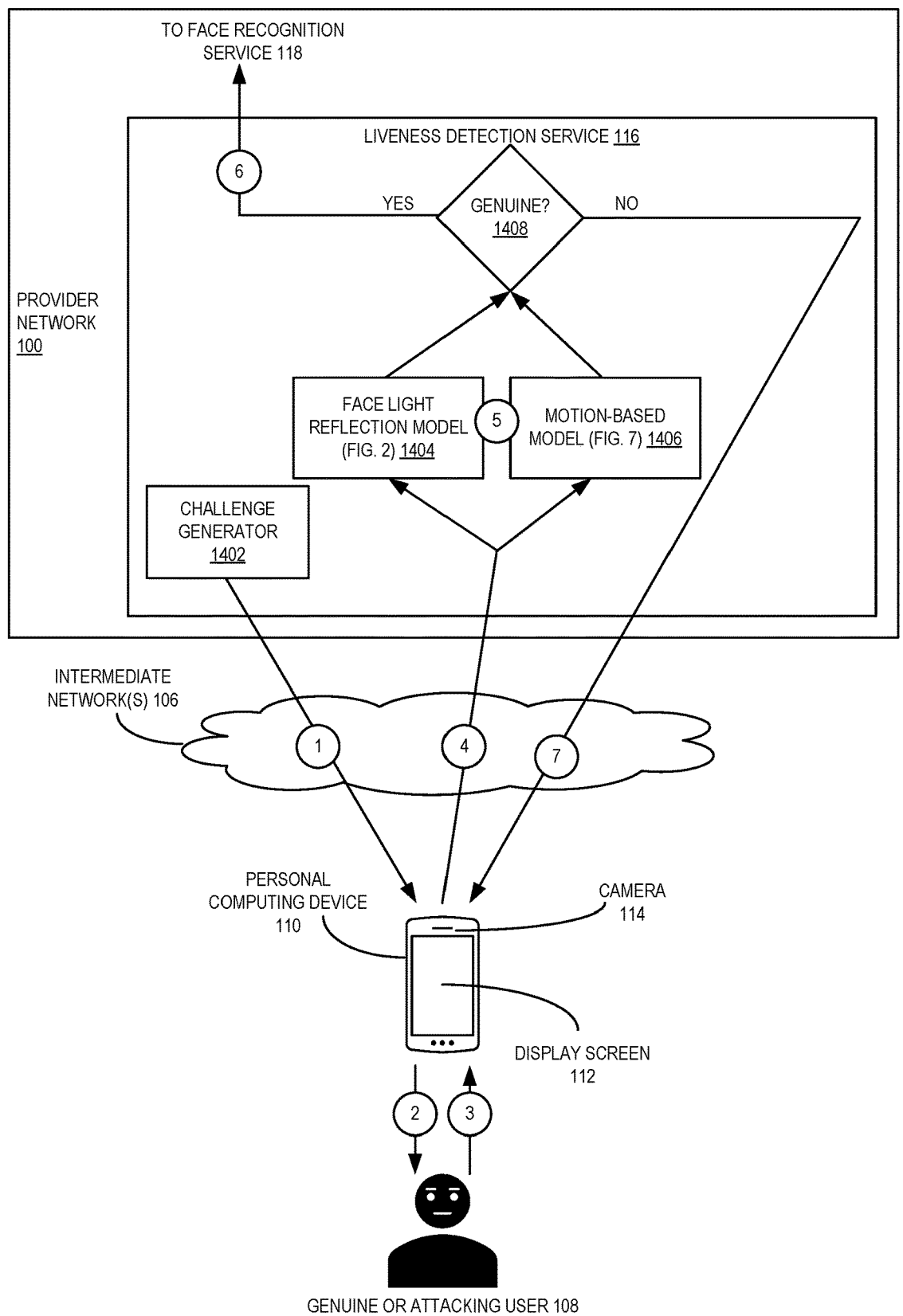
FIG. 14 depicts the face authentication computer system of FIG. 1 in which the liveness detection service can be programmed or configured to perform liveness detection using the face light reflection model of FIG. 2 and the motion-based model of FIG. 7, according to some examples.

FIG. 14 illustrates liveness detection service 116 that uses a hybrid of the face light reflection model and the motion-based model to make a liveness determination. Here, challenge generator 1402 can be programmed or configured to generate at step 1 both (1) a color light pattern sequence to be displayed on screen 112 as described above with respect to FIG. 2, FIG. 3, and FIGS. 4 and (2) a face oval sequence to be displayed on screen 112 as described above. Alternatively, just the color light pattern sequence can be generated by challenge generator 1402 and the face oval challenge can be generated at device 110 as described above. The color light pattern challenge and the face oval challenge can be displayed on screen 112 at the same time or overlapping in time. Alternatively, the color light pattern challenge and the face oval challenge can be displayed on screen 112 one after the other. In either case, a set of challenge-response video frames for the color light pattern sequence can be received by face reflection light reflection model 1404 and a set of target images (e.g., the same or overlapping set of target images as received by face light reflection model 1404 can be received by motion-based model 1406.

Face light reflection module 1404 can process a set of target frames to produce a classification (e.g., "genuine" or "fake") for user 108 as described above. Likewise, motion-based model 1406 can process its set of challenge-response video frames to produce a classification (e.g., "genuine" or "fake") for user 108 as described above.

Decision module 1408 can be programmed or configured to make a liveness determination based on the respective classifications by face light reflection module 1404 and motion-based module 1406. In some examples, decision module 1408 can be programmed or configured to determine that user 108 is genuine only if both face light reflection module 1404 and motion-based module 1406 classify user 108 as genuine. If either face reflection module 1404 or motion-based module 1406 does not classify user 108 as genuine, then decision module 1408 can be programmed or configured to determine that user 108 is not genuine.

Various machine learning classifiers are described herein. The output of a trained binary classifier for an input sample can be a "liveness" logit representing an unnormalized output of the classifier. A "liveness" probability can be generated by applying a normalization activation function such as a softmax or a sigmoid function to the liveness logit. In the case of a binary classifier, the liveness probability can be a single probability value reflecting the probability that the input sample belongs to one of the two classes. For a binary classifier and a multiclass classifier, the liveness probability can encompass a probability value for each class. A "liveness" score can be computed based on the liveness probability, possibly in combination with other inputs. The liveness score represents a decision by liveness detection service 116 based on the liveness probability that the input sample represents a genuine user or an attacking user. For example, a liveness score can be determined based on applying a set of one or more thresholds to the liveness probability. A liveness score can be a numerical value or Boolean value representing the decision. Multiple liveness scores based on multiple classifiers can be combined (aggregated) to determine an overall liveness score that represents a final decision of whether the input sample represents a genuine user or an attacking user. For example, returning to FIG. 14, decision module 1408 can determine an overall liveness score based on a liveness score from face light reflection module 1404 and a liveness score from motion-based module 1406.

Figure 15:
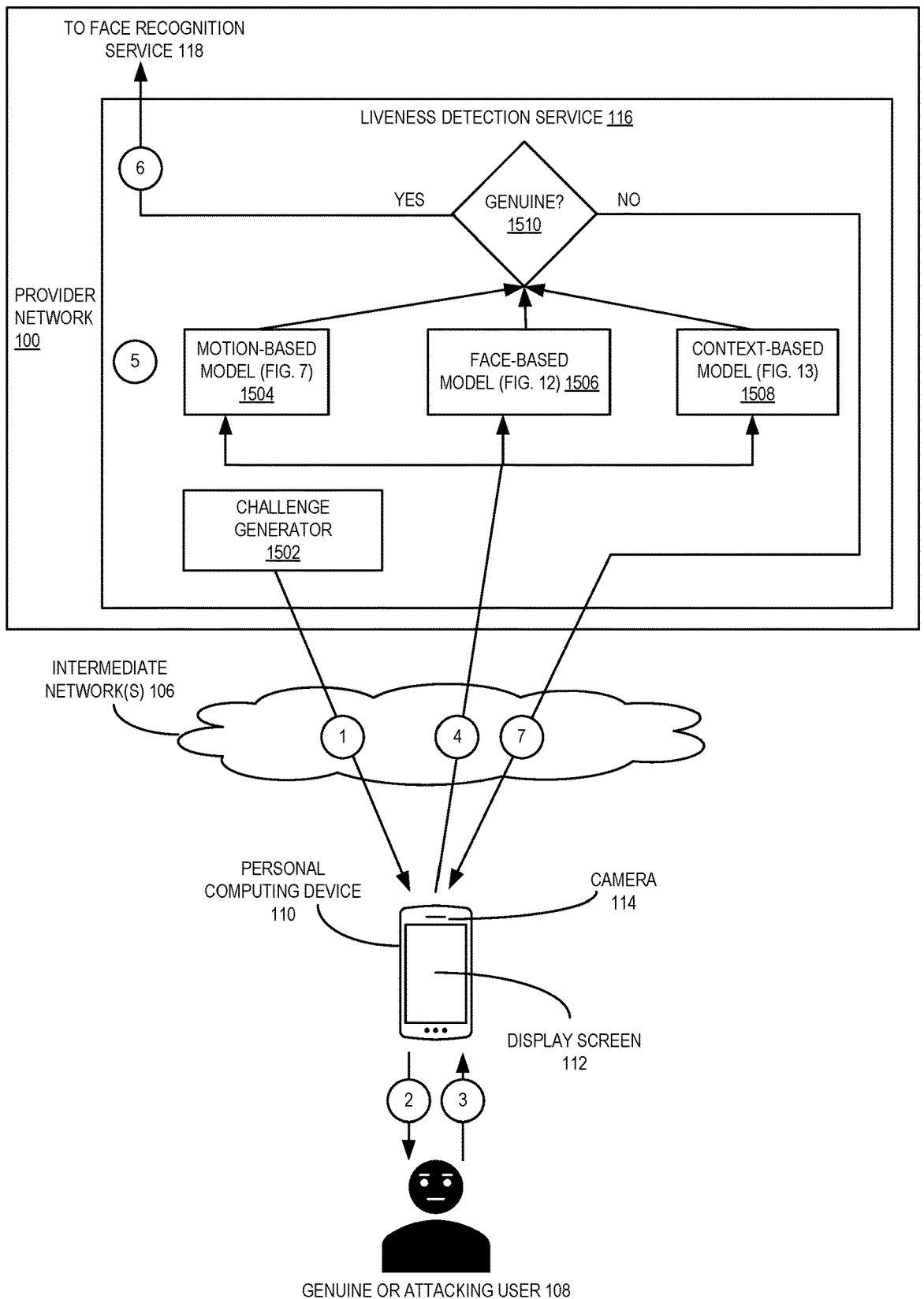
FIG. 15 depicts the face authentication computer system of FIG. 1 in which the liveness detection service can be programmed or configured to perform liveness detection using a combination of the motion-based model of FIG. 7, the face-based model of FIG. 12, and the context-based model of FIG. 13.

FIG. 15 illustrates liveness detection service 116 that uses a hybrid of the motion-based model 1504, the face-based model 1506, and the context-based model 1508 to make a liveness determination. Here, challenge generator 1502 can be programmed or configured to generate at step 1 a face bounding shape challenge to be displayed on screen 112. The response to the face bounding shape challenge at step 3 as captured in the set of target images sent from device 110 to liveness detection service 116 can be used by motion-based model 1504 to make a liveness determination. The face bounding shape challenge can instead be generated at device 110. A set of target images can be sent at step 4 to liveness detection service 116 for use by face-based mode 1506 to make a liveness determination according to face-based model 1506. Likewise, a set of target images can be sent at step 4 to liveness detection service 116 for use by context-based module 1508 to make a liveness detection according to a context-based model 1508.

Decision module 1510 can make a final liveness determination based on the liveness determinations made by motion-based model 1504, face-based model 1506, and context-based model 1508. In some examples, decision module 1510 determines that user 108 is genuine only if each of motion-based module 1504, face-based model 1506, and context-based model 1508 determine that user 108 is genuine. If any one or more of motion-based module 1504, face-based model 1506, or context-based model 1508 determines that user 108 is not genuine, then decision module 1510 can determine make a final liveness determination that user 108 is not genuine. In that case, liveness detection service 116 can return data to device 110 indicating that the face-based authentication process failed. On the other hand, if liveness detection service 116 determines that user 108 is genuine, then a set of video frames or data derived thereof (e.g., a representative face image) can be sent to face recognition service 118 for authenticating the face of user 108.

Figure 16:
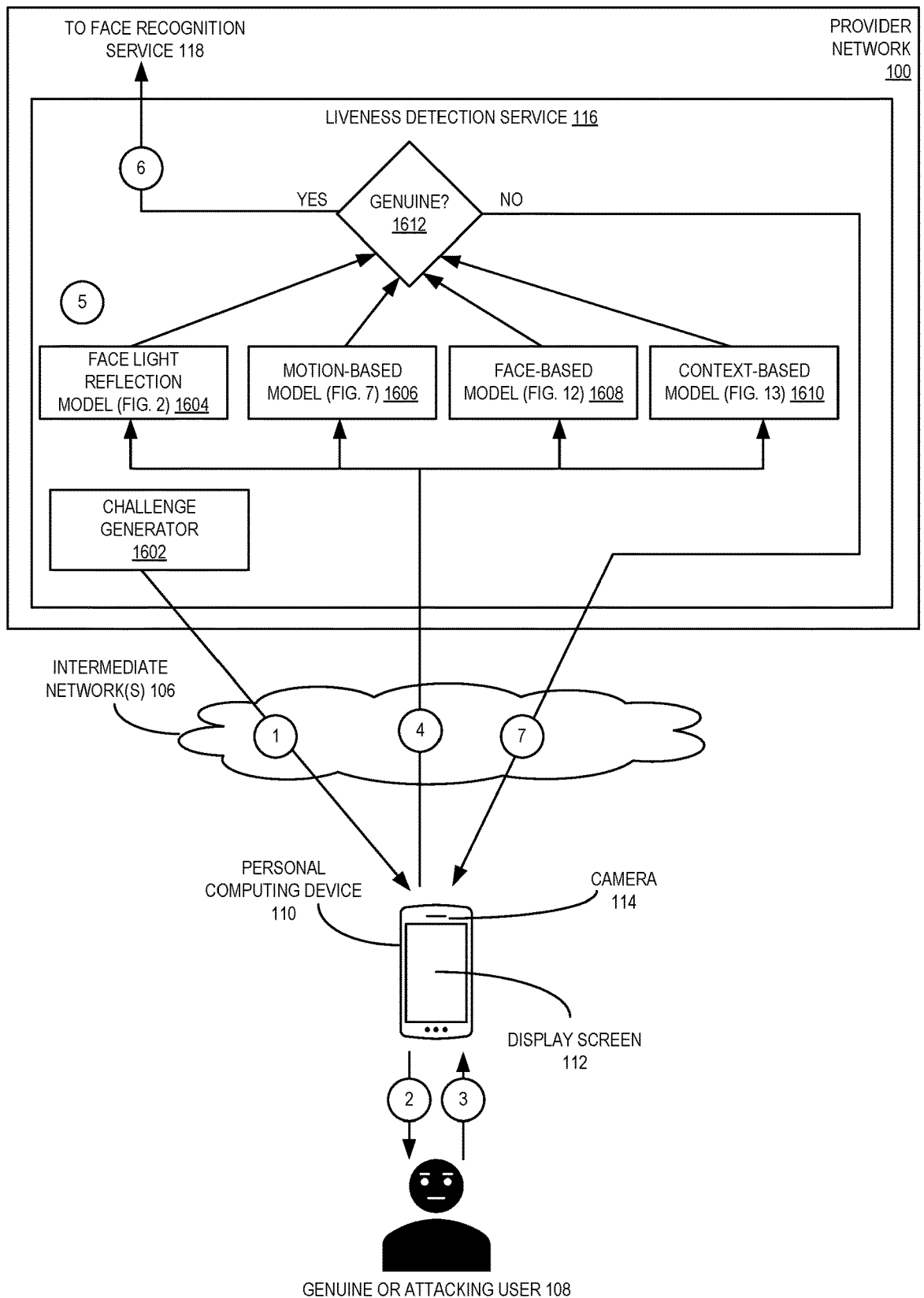
FIG. 16 depicts the face authentication computer system of FIG. 1 in which the liveness detection service can be programmed or configured to perform liveness detection using a combination of the face light reflection model of FIG. 2, the motion-based model of FIG. 7, the face-based model of FIG. 12, and the context-based model of FIG. 13.

FIG. 16 illustrates liveness detection service 116 that uses a hybrid of face light reflection model 1604, motion-based model 1606, face-based model 1608, and context-based model 1610 to make a liveness determination. Here, challenge generator 1602 can be programmed or configured to generate at step 1 a color light pattern challenge and a face bounding shape challenge to be displayed on screen 112. Alternatively, challenge generator 1602 can be programmed or configured to generate at step 1 just a color light pattern challenge and a face bounding shape challenge can be generated at device 110. The response to the color light pattern challenge and the face bounding shape challenge can be captured in one or more sets of target images at step 3 and sent (streamed) to liveness detection service 116 at step 4.

At step 5, each of face light reflection model 1604, motion-based model 1606, face-based model 1608, and context-based model 1610 can make a liveness determination based on a set of target images received from device 110. In some examples, decision module 1612 determines that user 108 is genuine only if each of face light reflection model 1604, motion-based model 1606, face-based model 1608, and context-based model 1610 determine that user 108 is genuine. If any one or more of these models determines that user 108 is not genuine, then decision module 1612 can determine make a final liveness determination that user 108 is not genuine. In that case, liveness detection service 116 can return data to device 110 indicating that the face authentication process failed. On the other hand, if liveness detection service 116 determines that user 108 is genuine, then a set of target images or data derived thereof (e.g., a representative face image) can be sent to face recognition service 118 for authenticating the face of user 108.

Example Computing Device

Figure 17:
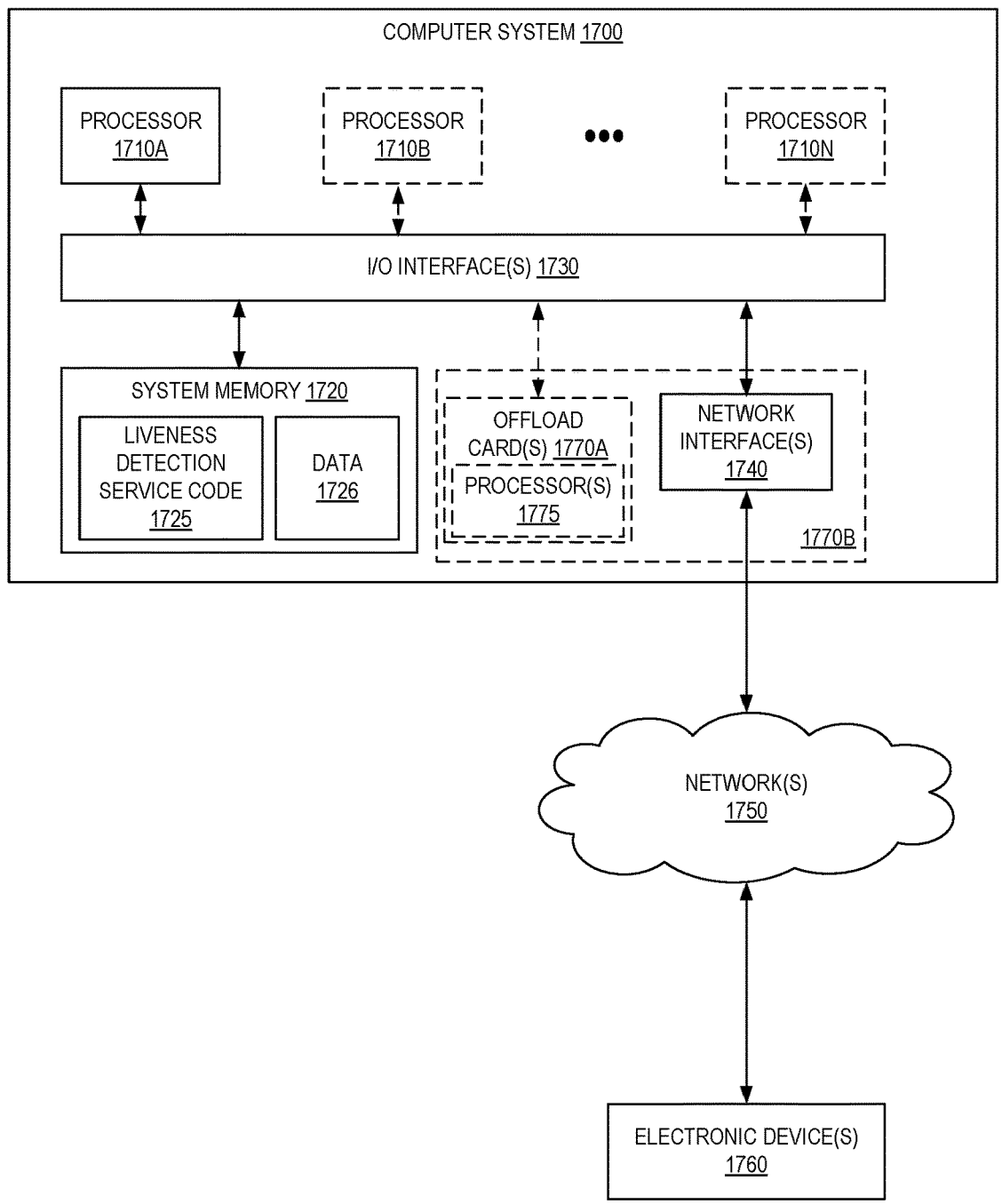
FIG. 17 is a block diagram illustrating an example computer system that can be used in some examples.

A system that implements a portion or all the techniques described herein can include a general-purpose computer system. In the illustrated embodiment, the computer system 1700 includes one or more processors 1710 coupled to system memory 1720 via input/output (I/O) interface 1730. System 1700 further includes network interface 1740 coupled to I/O interface 1730. While FIG. 17 shows computer system 1700 as a single computing device, in various examples computer system 1700 can include one computing device or any number of computing devices configured to work together as single computer system 1700 as in a distributed, parallel, or clustered computing system arrangement.

Computer system 1700 can be a uniprocessor system including one processor 1710, or a multiprocessor system including several processors 1710 (e.g., two, four, eight, or another suitable number). Processor(s) 1710 can be any suitable processor(s) capable of executing instructions. For example, in various examples, processor(s) 1710 can be general-purpose or embedded processors implementing any of a variety of instruction set architectures (ISAs), such as the X86, ARM, POWERPC, SPARC, or MIPS ISAs, or any other suitable ISA. In multiprocessor systems, each of processors 1710 can commonly, but not necessarily, implement the same ISA.

System memory 1720 can store instructions and data accessible by the processor(s) 1710. In various examples, system memory 1720 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1720 as liveness detection service code 1725 (e.g., executable to implement, in whole or in part, the liveness detection service 116) and data 1726.

In some examples, I/O interface 1730 can be configured to coordinate I/O traffic between processor(s) 1710, system memory 1720, and any peripheral devices in the device, including network interface 1740 or other peripheral interfaces (not shown). In some examples, I/O interface 1730 can perform any necessary protocol, timing, or other data transformations to convert data signals from one component (e.g., system memory 1720) into a format suitable for use by another component (e.g., processor(s) 1710). In some examples, I/O interface 1730 can include support for devices attached through various types of peripheral buses, such as a variant of the PERIPHERAL COMPONENT INTERCONNECT (PCI) bus standard or the UNIVERSAL SERIAL BUS (USB) standard, for example. In some examples, the function of I/O interface 1730 can be split into two or more separate components, such as a north bridge and a south bridge, for example. Also, in some examples, some or all of the functionality of I/O interface 1730, such as an interface to system memory 1720, can be incorporated directly into processor 1710.

Network interface 1740 can be configured to allow data to be exchanged between computer system 1700 and other devices 1760 attached to network(s) 1750, such as other computer systems or devices as illustrated in FIG. 1, for example. In various examples, network interface 1740 can support communication via any suitable wired or wireless general data networks, such as types of Ethernet network, for example. Additionally, network interface 1740 can support communication via telecommunications/telephony networks, such as analog voice networks or digital fiber communications networks, via storage area networks (SANs), such as Fibre Channel SANs, and/or via any other suitable type of network and/or protocol.

In some examples, computer system 1700 includes one or more offload cards 1770A or 1770B (including one or more processors 1775, and possibly including one or more network interfaces 1740) that are connected using I/O interface 1730 (e.g., a bus implementing a version of the PERIPHERAL COMPONENT INTERCONNECT-EXPRESS (PCI- E) standard, or another interconnect such as a QUICKPATH INTERCONNECT (QPI) or ULTRAPATH INTERCONNECT (UPI)). For example, in some examples computer system 1700 can act as a host electronic device (e.g., operating as part of a hardware virtualization service) that hosts compute resources such as compute instances, and one or more offload cards 1770A or 1770B execute a virtualization manager that can manage compute instances that execute on the host electronic device. As an example, in some examples offload card(s) 1770A or 1770B can perform compute instance management operations, such as pausing or un-pausing compute instances, launching or terminating compute instances, performing memory transfer/copying operations, etc. These management operations can, in some examples, be performed by offload card(s) 1770A or 1770B in coordination with a hypervisor (e.g., upon a request from a hypervisor) that is executed by other processors 1710A-1710N of computer system 1700. However, in some examples the virtualization manager implemented by offload card(s) 1770A or 1770B can accommodate requests from other entities (e.g., from compute instances themselves), and cannot coordinate with (or service) any separate hypervisor.

In some examples, system memory 1720 can be one embodiment of a computer-accessible medium configured to store program instructions and data as described above. However, in other examples, program instructions or data can be received, sent, or stored upon different types of computer-accessible media. Generally speaking, a computer-accessible medium can include any non-transitory storage media or memory media such as magnetic or optical media, e.g., disk or DVD/CD coupled to computer system 1700 via I/O interface 1730. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of computer system 1700 as system memory 1720 or another type of memory. Further, a computer-accessible medium can include transmission media or signals such as electrical, electromagnetic, or digital signals, conveyed via a communication medium such as a network or a wireless link, such as can be implemented via network interface 1740.

In the foregoing detailed description, reference is made to examples, examples of which are illustrated in the accompanying drawings. Numerous specific details are set forth to provide a thorough understanding of the examples. However, it is apparent that some examples can be practiced without these specific details. In other instances, well-known elements, features, acts, or operations have not been described in detail so as not to unnecessarily obscure the examples.

Bracketed text and blocks with dashed borders (e.g., large dashes, small dashes, dot-dash, or dots) are used herein to illustrate optional aspects that add to some examples. However, such notation should not be taken to mean that these are the only options or the only optional aspects, or that blocks with solid borders are not optional in certain examples.

Reference numerals with suffix letters (e.g., 1710-1 . . . 1710-N) are used to indicate merely that there can be one or multiple instances of the referenced element, feature, act, or operation, and when there are multiple instances, each does not need to be identical but can instead share some general traits or act in common ways. The particular suffixes used are not meant to imply that a particular amount of the element, feature, act, or operation exists unless specifically indicated to the contrary. Thus, two elements, features, acts, or operations using the same or different suffix letters might or might not have the same number of instances in various examples.

Unless the context clearly indicates otherwise, the term "or" is used in the foregoing specification and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A method comprising:
   receiving, at a liveness detection service of a provider network, a target image sent from a personal computing device;
   determining an initial position of a face in the target image;
   defining a first face bounding shape on a display screen of the personal computing device based on the initial position of the face in the target image;
   defining a second face bounding shape on the display screen of the personal computing device, wherein a size or shape of the second face bounding shape is different than a size or shape of the first face bounding shape;
   capturing a first set of target images that characterizes a first motion of the face while the face is within the first face bounding shape;
   capturing a second set of target images that characterizes a second motion of the face while the face is within the second face bounding shape;
   using a motion-based model of the liveness detection service to determine a set of vectors representing motion of the face in the first set of target images and the second set of target images;
   determining, at the liveness detection service using the motion-based model based on the set of vectors, that the motion of the face is genuine;

determining, at the liveness detection service using a face-based model, that the face that appears in the target image is genuine;

determining, at the liveness detection service using a context-based model, that a background that appears in the target image is genuine; and making a final liveness determination based on all of: the determination that the motion of the face is genuine, the determination that the face is genuine, and the determination that the background is genuine.

2. The method of claim 1, further comprising, based on the final liveness determination, authenticating the face that appears in the target image.

3. The method of claim 1, wherein:

the motion-based model is a classifier trained to classify a motion feature representation of the face motion extracted from the first set of target images and the second set of target images;

the face-based model is a classifier trained to classify a data representation of a set of image features extracted from a region of the target image containing the face; and the context-based model is a classifier trained to classify a data representation of a set of image features extracted from a non-face region of the target image.

4. A method comprising:

receiving a target image sent from a personal computing device;

determining an initial position of a face in the target image;

defining a first face bounding shape on a display screen of the personal computing device based on the initial position of the face in the target image;

defining a second face bounding shape on the display screen of the personal computing device, wherein a size or shape of the second face bounding shape is different than a size or shape of the first face bounding shape;

capturing a first set of target images that characterizes a first motion of the face while the face is within the first face bounding shape;

capturing a second set of target images that characterizes a second motion of the face while the face is within the second face bounding shape;

using a motion-based model to determine a set of vectors representing motion of the face in the first set of target images and the second set of target images;

making a first liveness determination using the motion-based model based on the set of vectors;

making a second liveness determination using a face-based model based on one or more target images of the sets of target images;

making a third liveness determination using a context-based model based on one or more target images of the sets of target images; and making a final liveness determination based on the first liveness determination, the second liveness determination, and the third liveness determination.

5. The method of claim 4, further comprising:

detecting the face in the target image;

extracting a set of one or more image features from a region of the target image containing the face; and making the second liveness determination based on the set of one or more image features.

6. The method of claim 4, further comprising:

detecting the face in the target image;

extracting a set of one or more image features from a region of the target image outside the face; and making the second liveness determination based on the set of one or more image features.

7. The method of claim 4, further comprising:

detecting the face in the target image;

extracting a set of one or more local binary pattern features from a region of the target image containing the face; and making the second liveness determination based on the set of one or more image features.

8. The method of claim 4, further comprising:

detecting the face in the target image;

extracting a set of one or more image-quality features from a region of the target image containing the face, the set of one or more image-quality features comprising at least one specular reflection feature, at least one blurriness feature, at least one chromatic moment feature, or at least one color diversity feature; and making the second liveness determination based on the set of one or more image-quality features.

9. The method of claim 4, further comprising:

using a convolutional neural network to make a classification as to liveness of a face image region in the target image; and making the second liveness determination based on the classification.

10. The method of claim 4, further comprising:

using a convolutional neural network to make a classification as to liveness of at least a non-face region of the target image; and making the third liveness determination based on the classification.

11. The method of claim 4, wherein:

the second liveness determination comprises a second determination that the face that appears in the target image is genuine; and the third liveness determination comprises a third determination that a background that appears in the target image is genuine.

12. The method of claim 4, further comprising, based on the final liveness determination, authenticating the face that appears in the target image.

13. A system comprising:

a set of one or more computing devices to implement a liveness detection service, the liveness detection service comprising instructions which when executed cause the liveness detection service to:

receive a target image sent from a personal computing device;

determine an initial position of a face in the target image;

define a first face bounding shape on a display screen of the personal computing device based on the initial position of the face in the target image;

define a second face bounding shape on the display screen of the personal computing device, wherein a size or shape of the second face bounding shape is different than a size or shape of the first face bounding shape;

capture a first set of target images that characterizes a first motion of the face while the face is within the first face bounding shape;

capture a second set of target images that characterizes a second motion of the face while the face is within the second face bounding shape;

use a motion-based model to determine a set of vectors representing motion of the face in the first set of target images and the second set of target images;

make a first liveness determination using the motion-based model based on the set of vectors;
make a second liveness determination using a face-based model based on one or more target images of the sets of target images;
make a third liveness determination using a context-based model based on one or more target images of the sets of target images; and
make a final liveness determination based on the first liveness determination, the second liveness determination, and the third liveness determination.

14. The system of claim 13, the liveness detection service further comprising instructions which when executed cause the liveness detection service to:
detect the face in the target image;
extract a set of one or more image features from a region of the target image containing the face; and
make the second liveness determination based on the set of one or more image features.

15. The system of claim 13, the liveness detection service further comprising instructions which when executed cause the liveness detection service to:
detect the face in the target image;
extract a set of one or more image features from a region of the target image outside the face; and
make the second liveness determination based on the set of one or more image features.

16. The system of claim 13, the liveness detection service further comprising instructions which when executed cause the liveness detection service to:
detect the face in the target image;
extract a set of one or more local binary pattern features from a region of the target image containing the face; and
make the second the second liveness determination based on the set of one or more image features.

17. The system of claim 13, the liveness detection service further comprising instructions which when executed cause the liveness detection service to:
detect the face in the target image;
extract a set of one or more image-quality features from a region of the target image containing the face, the set of one or more image-quality features comprising at least one specular reflection feature, at least one blurriness feature, at least one chromatic moment feature, or at least one color diversity feature; and
make the second liveness determination based on the set of one or more image-quality features.

18. The system of claim 13, the liveness detection service further comprising instructions which when executed cause the liveness detection service to:
use a convolutional neural network to make a classification as to liveness of a face image region in the target image; and
make the second liveness determination based on the classification.

19. The system of claim 13, the liveness detection service further comprising instructions which when executed cause the liveness detection service to:
use a convolutional neural network to make a classification as to liveness of at least a non-face region of the target image; and
make the third liveness determination based on the classification.

20. The system of claim 13, the liveness detection service further comprising instructions which when executed cause the liveness detection service to authenticate the face that appears in the target image based on the final liveness determination.

* * * * *